US011086045B2

(12) United States Patent
Pyrak-Nolte et al.

(10) Patent No.: US 11,086,045 B2
(45) Date of Patent: Aug. 10, 2021

(54) SYSTEM AND METHOD OF MAPPING TOPOLOGY

(71) Applicant: Purdue Research Foundation, West Lafayette, IN (US)

(72) Inventors: Laura Pyrak-Nolte, Lafayette, IN (US); David Nolte, Lafayette, IN (US); Nicholas Nolte, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 411 days.

(21) Appl. No.: 16/233,286

(22) Filed: Dec. 27, 2018

(65) Prior Publication Data

US 2019/0204474 A1 Jul. 4, 2019

Related U.S. Application Data

(60) Provisional application No. 62/612,524, filed on Dec. 31, 2017.

(51) Int. Cl.
*G01V 9/00* (2006.01)
*G01V 1/28* (2006.01)
(Continued)

(52) U.S. Cl.
CPC .............. *G01V 9/00* (2013.01); *E21B 47/095* (2020.05); *G01V 1/001* (2013.01); *G01V 1/02* (2013.01);
(Continued)

(58) Field of Classification Search
USPC .......................................................... 702/11
See application file for complete search history.

(56) References Cited

U.S. PATENT DOCUMENTS 7,134,492 B2 * 11/2006 Willberg ................. E21B 47/00
166/250.1
2011/0198221 A1 * 8/2011 Angelescu ........ A61M 5/14248
204/400
(Continued)

OTHER PUBLICATIONS

Ardakani et al., Microseismicity-derived fracture network characterization of unconventional reservoirs by topology, 2018, Interpretation, SE49-SE61.
(Continued)

*Primary Examiner* — Paul D Lee
(74) *Attorney, Agent, or Firm* — Piroozi-IP, LLC

(57) ABSTRACT

A system for determining a fingerprint of a structure is provided. The system includes a plurality of granules inserted in a structure having a plurality of fissures, fractures, and cracks (collectively apertures), each granule comprising a membrane, and at least one bubble of compressed gas formed in the membrane, the membrane selectively dissolving in presence of a predetermined fluid and thereby selectively bursting the at least one bubble, thereby generating a concussing vibration, at least at least i) three detection devices for two-dimensional mapping or ii) four detection devices for three-dimensional mapping placed proximate to the structure according to a predetermined placement schedule, and a computing device comprising a processor configured to receive data from the at least three or four detection devices and to determine location of the at least one bubble of each of the plurality of the granules at the time of bursting by triangulating the concussive vibration in order to determine location of the at least one bubble.

20 Claims, 26 Drawing Sheets

(51) Int. Cl.
- *G01V 1/00* (2006.01)
- *G01V 1/30* (2006.01)
- *G01V 1/02* (2006.01)
- *G01V 1/42* (2006.01)
- *E21B 47/095* (2012.01)

(52) U.S. Cl.
CPC ............. *G01V 1/288* (2013.01); *G01V 1/30* (2013.01); *G01V 1/301* (2013.01); *G01V 1/306* (2013.01); *G01V 1/42* (2013.01); *G01V 9/007* (2013.01); *G01V 2210/1234* (2013.01)

(56) References Cited

U.S. PATENT DOCUMENTS

| | | | |
|---|---|---|---|
| 2013/0269423 A1* | 10/2013 | Angelescu | A61M 5/14248 73/54.01 |
| 2014/0216730 A1* | 8/2014 | Ersoz | G01V 1/42 166/250.1 |
| 2015/0354337 A1* | 12/2015 | Ersoz | E21B 47/00 166/250.1 |
| 2016/0146963 A1* | 5/2016 | Hall | G01V 1/42 166/250.1 |
| 2019/0062623 A1* | 2/2019 | Risser | G01V 1/02 |

OTHER PUBLICATIONS

Smith et al., Estimation of fracture aperture using hydraulic and tracer tests, 1987, 28th U S Symposium on RockMechanics.
Chen, Acoustic Behavior of Flow From Fracture to Wellbore, 2015, Masters Thesis.
Dorn et al., Inferring transport characteristics in a fractured rock aquifer by combining single-hole ground-penetrating radar reflection monitoring and tracer test data, 2012, Water Resources Research, vol. 48, W11521.
Rassenfoss, Electromagnetic Imaging Offers First Look at the Propped Rock, 2016, JPT.
Finfer et al., Non-intrusive Multiple Zone Distributed Acoustic Sensor Flow Metering, 2015, SPE International.
King, Tracking Fracture Fluid Movement with Chemical and Gamma-Emitting Tracers with Verification by Microseismic Recording, 2011, EPA Hydraulic Fracturing Workshop.
Kumar et al., Diagnosing Fracture-Wellbore Connectivity Using Chemical Tracer Flowback Data, 2018, Resources Technology Conference.
Marine, Determination of the Location and Connectivity of Rock With In-Hole Tracers, 1979, Geological Society of America.
Maxwell et al., The role of passive microseismic monitoring in the instrumented oil field, 2001, The Leading Edge, 636-639.

* cited by examiner

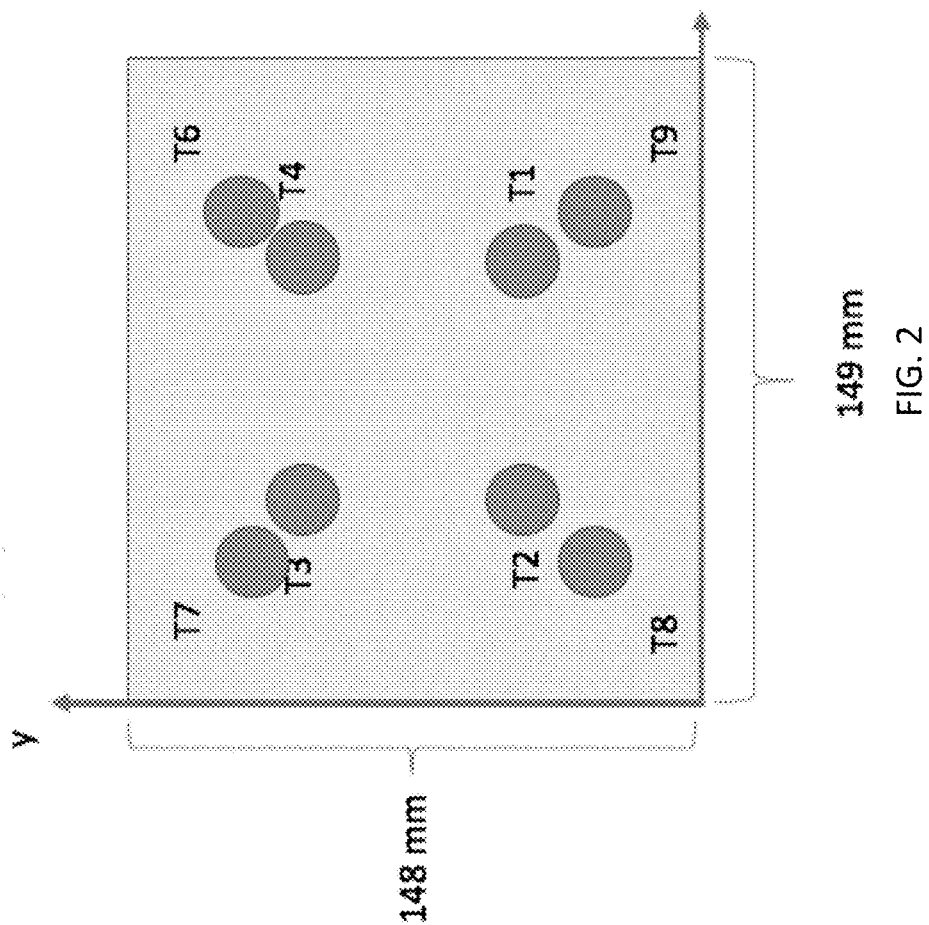

SYSTEM AND METHOD OF MAPPING TOPOLOGY

CROSS-REFERENCE TO RELATED APPLICATIONS

The present patent application is related to and claims the priority benefit of U.S. Provisional Patent Application Ser. No. 62/612,524 filed 31 Dec. 2017, the content of which is hereby incorporated by reference in its entirety into the present disclosure.

STATEMENT REGARDING GOVERNMENT FUNDING

This invention was made with government support under DE-FG02-09ER16022 awarded by the U.S. Department of Energy. The government has certain rights in the invention.

TECHNICAL FIELD

The present disclosure generally relates to mapping, and in particular to mapping of above-ground and subterranean structures.

BACKGROUND

This section introduces aspects that may help facilitate a better understanding of the disclosure. Accordingly, these statements are to be read in this light and are not to be understood as admissions about what is or is not prior art.

Fracking has become a popular methodology for enhancing the ability to extract hydrocarbons from rock. Typically, fracking is based on the injection of fluids into subterranean rock to induce fissures. Such hydraulic treatment includes use of a solid proppant material that is mixed with a fluid and then injected into a wellhead and through a wellbore, at relatively high pressures. The high-pressure of the boring fluid acts against a natural reservoir pressures and once the natural reservoir pressure is exceeded, the fluid induces fractures in the subterranean structures. Once the fractures are formed, the proppant enter these fissures, whereby they maintain the aperture of the fractures thereby allowing extraction of hydrocarbons.

The induced fracture and fissure networks extended tens and hundreds of meters beyond the wellhead and borehole. Given these large distances, there exists no reliable ways to determine a fingerprint of the fissure and fracture networks, thereby resulting in a near blind operation. This lack of visibility as to where the cracks and fissures are forming, or if they intersect natural fracture networks, may lead to undesirable operations near domestic water wells, which can introduce caustic chemicals into the corresponding aquifer.

Others have attempted to determine fingerprints of cracks and fissures by tagging proppants. For example, US Pub. App. No. 2015/0353817 for Kersey introduces such a tagging approach, wherein functionalized polymer proppants are configured to release tracer/taggants chemical compounds in developing a fingerprint for the fracking operating. However, such a tagging operation can be difficult as the tracer/tagging material can be diluted and further would have to be analyzed with sophisticated equipment to disassociate and discriminate between different zones. A tracer/tagging approach only provides information that some path exists between two endpoints, namely the input and output locations of the tracer/tag, but does not provide any information on how the two endpoints connect spatially in three dimensional structures or subterranean natural/induced fracture networks. Furthermore, the resolution of the mapping is limited to these shortcomings.

Therefore, there is an unmet need for a novel approach for mapping above-ground and subterranean structures with high resolution which overcome the stated shortcomings of the prior art.

SUMMARY

A system for determining a fingerprint of a structure is provided. The system includes a plurality of granules inserted in a structure having a plurality of fissures, fractures, and cracks (collectively apertures). Each granule includes a membrane and at least one bubble of compressed gas formed in the membrane. The membrane is selectively provided to dissolve in presence of a predetermined fluid and thereby selectively bursting the at least one bubble, thereby generating a concussing vibration. The system further includes at least i) three detection devices for two-dimensional mapping or ii) four detection devices for three-dimensional mapping placed near the structure according to a predetermined placement schedule, as well as a computing device which includes a processor configured to receive data from the at least three or four detection devices and to determine location of the at least one bubble of each of the plurality of the granules at the time of bursting by triangulating the concussive vibration in order to determine location of the at least one bubble.

A method for determining a fingerprint of a structure is also disclosed. The method includes inserting a plurality of granules in a structure. The structure includes a plurality of fissures, fractures, and cracks (collectively apertures). Each granule includes a membrane, and at least one bubble of compressed gas formed in the membrane. The membrane is selectively provided to dissolve in presence of a predetermined fluid and thereby selectively bursting the at least one bubble, thereby generating a concussing vibration. The method also includes detecting the concussing vibration associated with bursting of the at least one bubble by at least i) three detection devices for two-dimensional mapping or ii) four detection devices for three-dimensional mapping placed near the structure according to a predetermined placement schedule. The method further includes receiving data from the at least three or four detection devices. In addition, the method includes triangulating the concussive vibrations by a processor in order to determine location of the at least one bubble.

BRIEF DESCRIPTION OF DRAWINGS

FIG. 2 is a schematic plan-view (fracture plane view) of detectors (T1-T9) placed on the blocks of FIG. 1, where T1, T2, T3, and T4 are placed on one block, and T6, T7, T8 and T9 are placed on the other block.

DETAILED DESCRIPTION

Figure 1:
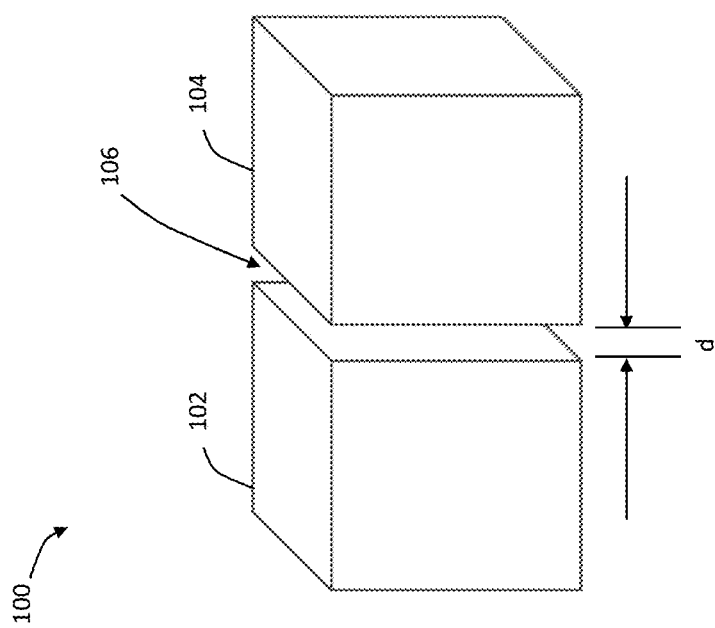
FIG. 1 is a perspective view of a laboratory setup showing two blocks separated by a small separation (i.e., aperture) through which granules descend, as proof of viability of the system of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach for mapping above-ground and subterranean structures with high resolution is disclosed herein which overcomes the stated shortcomings of the prior art. The approach generally includes use of high-pressure gas-filled particles in a mixture that when they come in contact with various media dissolve and release the high-pressure gas in a concussing manner. The release of the high-pressure gas generates vibration energy in the form of sound, which can be detected by strategically placed transducers/sensors. When such detections are integrated together, they can provide a map of the structures into which such particles are injected.

The novel approach discussed herein uses active particle swarms as chemically-induced micro-seismicity sources that are filled with high-pressure gasses. These particles are referred to herein as granules. The release of these granules follows one of two approaches: (1) Particle Swarm Release (PRS); and (2) Chemically Induced Micro-Seismicity Particles (CIMSP). PRS enables delivery of the particles to the dominant flow path through a fracture system. Chemically-activated particles enable a rapid release of compressed $CO_2$ or other gases to generate micro-seismicity and act as internal moving sources along the entire flow path and can be engineered to release when only in contact with specific fluids or fluid properties. The particles can release a multitude of times, lasting minutes to hours. When these granules are activated (i.e., when the high-pressure gasses are released in concussing manner), the concussing effect can be used to illuminate connected flow paths through fractures in opaque materials. The micro-seismicity is induced through the percussive release of these gasses through a chemical dissolution of the granules as the swarm moves through fractures moving together in a process referred to herein as swarm transport. Alternatively, the concussing effect can be dispersed such that individual granules do not interact with one-another. This chemically-induced micro-seismicity illuminates the flow path (detected using acoustic imaging sensors, e.g., piezoelectric transducers), whereby the microseismic waves are used to characterize the surrounding rock to inform of the presence of fractures and fracture networks used in different applications.

According to the present disclosure, a continuous recording of waves generated by chemically induced Micro-Seismicity (CIMS), provides a data set that can be used to provide a fingerprint of the above-ground or subterranean structures. In addition, Phase Component Monitoring (PCM) can also be used to interpret location, geometry, extent of fractures containing particle swarms and interpret the location of other fractures in the fracture system from changes in spectral content, mode-conversion and scattering, as discussed in full detail below.

Subsurface engineering activities or sustainable and safe storage of carbon dioxide ($CO_2$) or extraction/injection of hydrocarbons in subsurface rock depends on the ability to image and characterize fracture systems throughout the life-cycle of the site. Engineered and natural changes in stress are of particular significance because fractures are topologically complex, span a range of length scales, and are routinely altered due to small modifications in physical and chemical processes. Of particular concern is the integrity of the caprock which is an impermeable geological unit (or a set of units) that prevents or minimizes leakage from deeper geologic storage sites or loss of hydrocarbons to the Earth's surface or aquifers during fracking. In hydrocarbon extraction/sequestration, this imaging system can be used to inform rock engineers about fractures and fracture networks that affect fluid extraction and/or sequestration in subterranean structures. In engineered structures, this imaging technique can be used to inform structural engineers of the soundness of structures, e.g., bridges, dams and tunnels.

Referring to FIG. 1, in a laboratory setting, an acoustic detection system 100 is depicted, according to the present disclosure. The system 100 includes transparent acrylic blocks 102 and 104, disposed to generate synthetic aperture fractures 106 with uniform and variable apertures. These acrylic blocks 102 and 104 enable optical monitoring of granule location and descent velocity as confirmation for acoustic detection. The acrylic blocks 102 and 104 were fabricated to be about 148 mm×148 mm×100 mm and were separated by the distance shown as "d" to form a uniform aperture fracture 106. Apertures of fracture 106 of 0.5, 1, 2, 4, 8, and 10 mm were tested. A fracture plane of about 148 mm by 148 mm was thus generated by placing the acrylic block 102 and 104 near each other.

An optical system and an acoustic monitoring system were utilized during the release and descent of the granular chemical sources. The optical system includes a processor (e.g., a RaspberryPI computer) and a camera which together were used to record video images (25 frames per second) of the entire fracture plane with a pixel edge length of about 550 micrometers. The camera was mounted a fixed distance away from the acrylic blocks 102 and 104. Acoustic waves were recorded using 8 piezoelectric transducers (e.g., Physical Acoustics F15 alpha sensors with a frequency range of 100-450 kHz) that were connected to an acoustic emission system (e.g., Mistra 24-Channel 16-Bit acoustic emission recording system). These transducers were placed on the outer face of each acrylic blocks 102 and 104 (see FIG. 2). Signals were recorded for channels receiving a signal above a certain threshold and an event was defined when 3 or more channels were triggered above the threshold. The data were stored in a binary format on a computer and on a backup drive.

Referring to FIG. 2, the approximate locations of the acoustic transducers placed on the two acrylic blocks 102 and 104, is shown. T1, T2, T3, T4 are on the front face of the block 104 separated a distance of about 200 mm from transducers T6, T7, T8, and T9 on block 102.

To test the efficacy of the novel approach of the present disclosure with respect to varying fractures, variable aperture fractures were created by forming various patterns shown in FIGS. 3(a)-3(f) of varying fracture apertures 200 (the reference numeral is only shown for one of the six designs) into a 2 mm thick rubber sheet that was placed between the two acrylic blocks 102 and 104 (see FIG. 1). Prior to saturating the fracture with water, the blocks were sealed along the sides and bottom of the fracture to prevent leakage. In FIGS. 3(a)-3(f), the solid black areas represent uncut rubber, and the solid white areas represent (i.e., cut) fractures with varying shapes. These shapes range from apertures with widths as small as about 1 mm to 10 mm and lengths as long as about 148 mm. The in-plane aperture was 2 mm (into the page).

Under gravity and other hydrodynamic conditions, granules (individually and in swarms) seek the path of least resistance through a porous fractured medium. Reactive granules made of sucrose were used with pressurized carbon dioxide (~600 psi—about 40 times greater than atmospheric pressure) within individual pockets, with at least one to 100 pockets per granule (FIG. 4(e)). As the granule dissolves, the compressed gas is released, yielding acoustic emissions (FIG. 4(d)). The reactive granules are denser than water and a single granule (ellipsoidal with about 0.5-3 mm in major-axis diameter) emits from hundreds to tens of thousands of acoustic event signals over about 4 minutes from the beginning of granule dissolution (shown in FIG. 4(d) discussed below). Referring to FIG. 4(a), a 2-dimensional projection of a subsection of a granule according to the present disclosure is provided. X-ray microscopy is obtained using a 3-dimensional X-ray Microscopy (Zeiss VERSA 510), which as shown in FIG. 4(b) depicts granules containing pressurized gas in the form of spherical bubbles that range in size from about 3 to about 200 micrometers. FIG. 4(b) provides a 3-dimensional X-ray tomographic reconstruction of a cylindrical volume (0.9 mm in diameter by 0.9 mm in height) of a reactive granule containing a distribution of bubble sizes (the dashed circle shows outline of an exemplary bubble with a diameter of about 200 μm). FIG. 4(c) is a histogram of average bubble size which ranges from about 9 samples per test based on the 3-dimensional X-ray tomographic reconstructions. As can be seen, the average size ranges from about 19 μm to about 40 μm. FIG. 4(d) is another histogram showing total number of recorded signals based on hit detection, i.e., for each channel, the number of signals with an amplitude greater than a selected threshold. In FIGS. 4(d), 1, 2, 3, 5, 6, and 7 refer to transducer/channel numbers. The order of the number of recorded signals is shown for Test 007. However, the same order applies to all the other tests (i.e., Test 001-006 and 008-010). FIG. 4(e) is another histogram showing number of bubbles in each measured granule. As can be seen in FIG. 4(e), the number of bubbles can range from about 2,000 per granule to about 90,000 per granule.

According to one embodiment, a dissolvable coating on the granules can assist in delaying the release of the concussing emissions until the granule is located at its target site. The coating can be selected from a group consisting essentially of sucrose, fructose, starch, silica, amorphous glass, hyper-stressed metastable glasses, triacylglycerols, phospholipids, glycolipids, hydrophobic proteins, organic compounds, aliphatics, salts, polyethylene, polystyrene, epoxies, polyvinyl chloride, polymethyl methacrylate, soda-lime-borate compositions, ceramic, foams, and combinations thereof.

It should be appreciated that often granules can include multiple particles weakly adhered together. When placed in water, the particles can separate to form a swarm that can transport as a group, or as individual particles to enable multiple tracking of the same path (see FIG. 15(a), discussed below).

Figure 5:
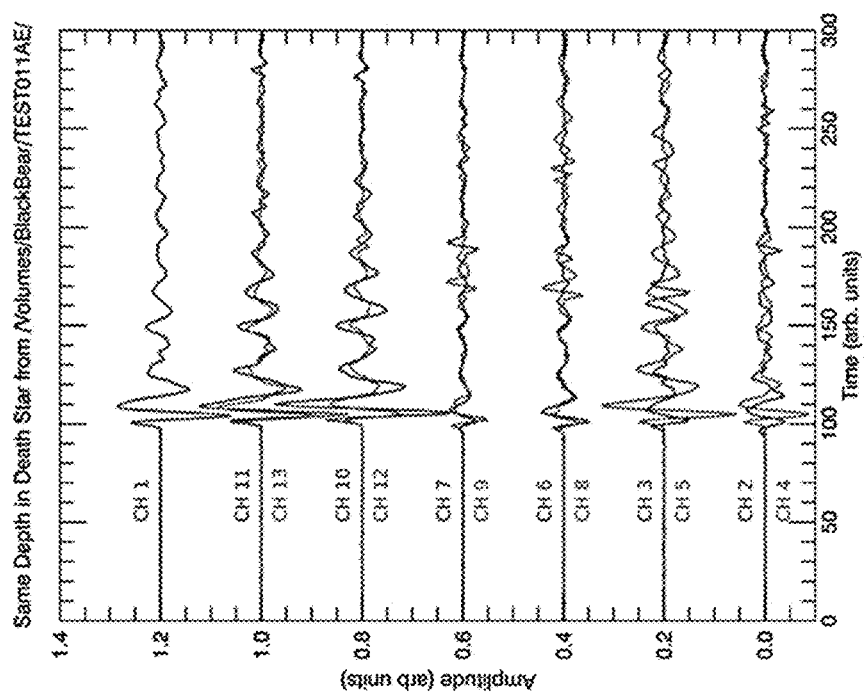
FIG. 5 is a graph of amplitude vs. time for each channel in a 13-channel detection system.

A source characterization device (SCD) was fabricated to measure and characterize the propagating wave front using 13 plane wave piezoelectric transducers (central frequency 1 MHz, bandwidth 0.1-1.5 MHz). The transducers were connected to the Mistra 24-Channel 16-Bit acoustic emission system to simultaneously record all 13 channels. A granule was attached to a hot-glue solidified thread and suspended in the SCD. The recorded signals are shown in FIG. 5 which provides amplitude vs. time graphs for each of the 13 channels. The source is purely explosive with diametrically opposed transducers exhibiting the same phase. Differences in arrival time indicate that the granule was not centered in the SCD. Differences in amplitude arise from the attachment of the granule to hot-glue on only one side.

Using the above-referenced chemically-induced microseismicity approach and swarm transport, also discussed above, allow one to both locate the dominant flow path from the acoustic emissions and to quantify/estimate the aperture size of the fracture as the emitting swarm velocity changes as it moves through a variable-aperture fracture.

Figure 6A:
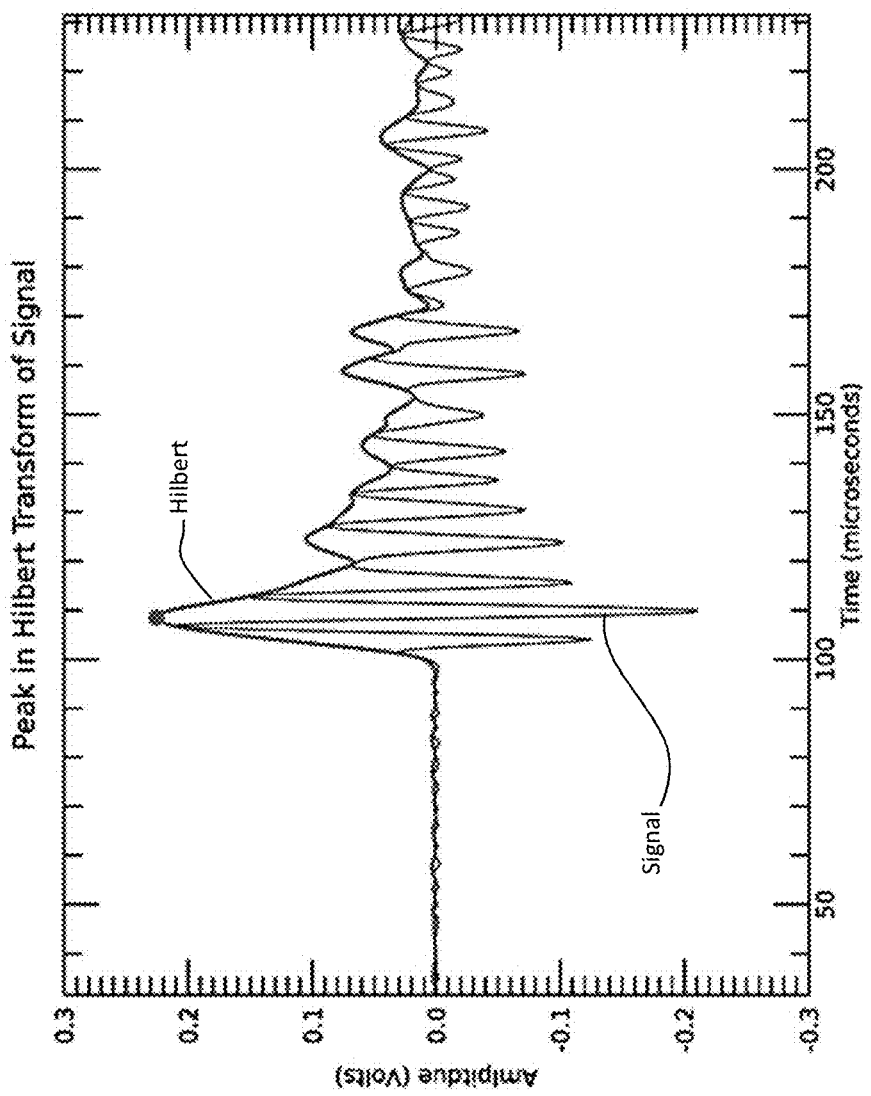
FIG. 6(a) is a graph of amplitude vs. time for both experimental data (identified as "Signal") as well as the derived envelope function used to define the arrival time of the event (identified as "Hilbert").
Figure 6B:
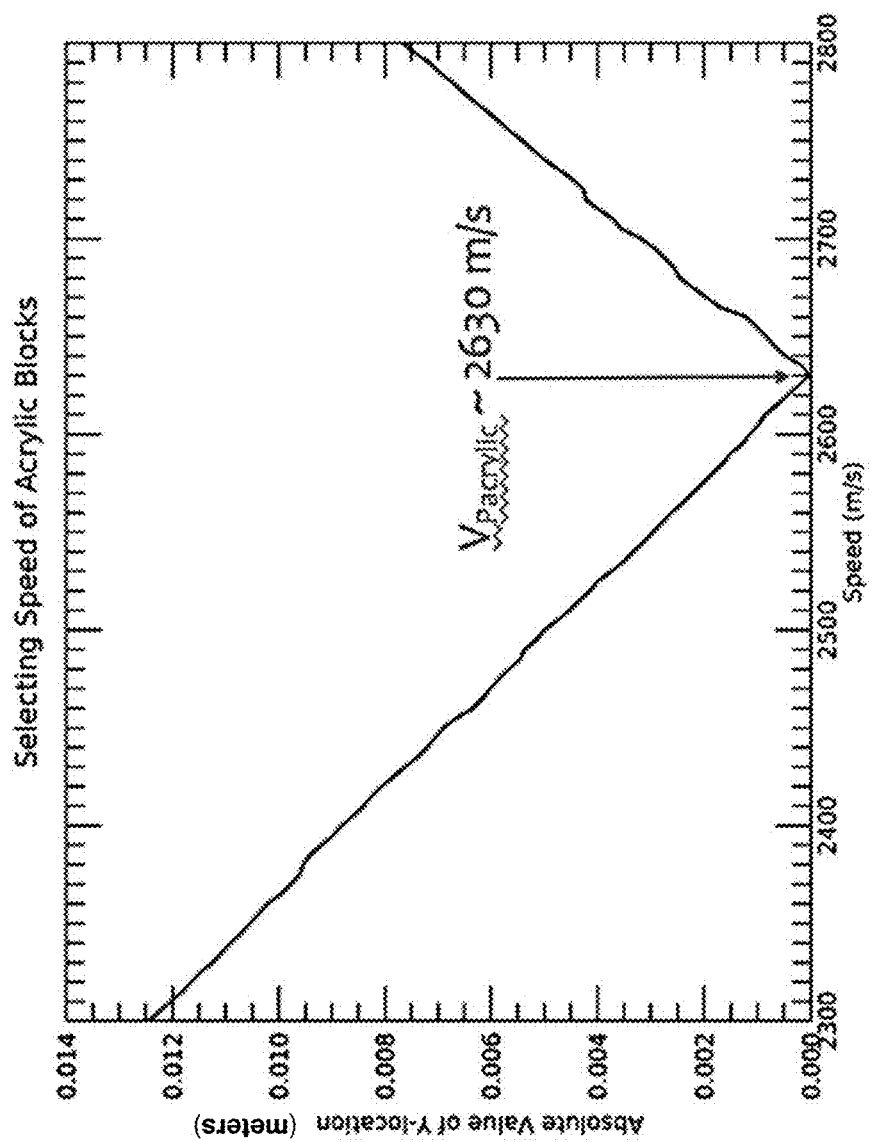
FIG. 6(b) is a graph of absolute value of Y location vs. speed used to determine the group velocity for acrylic block shown in FIG. 1 by finding the minimum value.

Referring to FIG. 6(a), a graph of amplitude vs. time is provided for both experimental data (identified as "Signal") as well as an envelope function of the data (identified as "Hilbert") using a Hilbert transform known to a person having ordinary skill in the art.

Once an event is identified, the first step is to quantify the time difference among the signals held in associated data files. For each event, all of the signal files are read and the time of each hit is extracted from the file header information. One channel is selected as a reference. The difference in triggered time (or time of arrival for continuously streamed data) between the reference channel and all other channels is calculated. The time base for the signals is generated. Next a Hilbert transformation is used to find the group arrival. A Hilbert transformation is performed on each signal (an example is shown in FIG. 6(a), discussed below). The Hilbert Transform $H(f)*f(t)$ is the convolution of a function, $f(t)$, with the Hilbert kernel $$g(t) = H(f)*f(t) = \frac{1}{\pi}\int_{-\infty}^{\infty}\frac{f(\tau)}{t-\tau}d\tau \tag{1}$$

FIG. 6(a) thus shows a typical recorded signal from a chemically-induced event. An analysis was performed to extract group arrival times to perform source location using a non-linear solver (e.g., using a Broyden approach). The compressional wave phase velocity in acrylic is about 2730 m/s. A minimization approach (FIG. 6(b), which is a graph of absolute value of Y location in volts vs. speed in m/s was used to determine the group velocity for acrylic (about 2630 m/s). After determining the wave speed in the acrylic, a Hilbert transformation was applied to all signals for each event (event is defined as when 3 or more transducers recorded signals with amplitudes above a predetermined threshold). Note that when a three-dimensional fracture network is to be interrogated, there must be 4 or more transducers (at least three for two-dimensional mapping) recorded signals with amplitudes above a predetermined threshold. Furthermore, the four transducers to be used to locate an event in three dimensions should be located at the vertices of a scalene tetrahedron to avoid accidental degeneracy in the numerical solution.

The function $f(t)$ is the measured signal, strain (can also be displacement or acceleration depending on the sensor) as a function of time. The Hilbert transform is used to identify wave packets in the signals (the envelope shown in FIG. 6(a)). The function $g(t)$ is the conjugate function to $f(t)$ such that the two functions added in quadrature yield the amplitude of the packet $$A(t)=\sqrt{g(t)^2+f(t)^2} \tag{2}$$

The peak of the Hilbert is easier to identify than a specific time-point of $f(t)$, and the peak is taken as the group arrival time as one of several triangulated arrival times needed to locate the event. To locate the moving source, the system of equations to solve for the event location is based on $$\frac{\sqrt{(x_{ti}-x_s)^2+(y_{ti}-y_s)^2+(z_{ti}-z_s)^2}}{V}-(t_s-\Delta t_i)=0 \tag{3}$$

where $t_s$ is the travel time from the source to the reference channel and is unknown. This equation is applied to each event with 3 or more signals from different sensors (for the planar fracture) with 4 or more signals from different sensors (for three-dimensional fractures or fracture networks). The subscript $t_i$ represents channel "i". $\Delta t_s$ and $\Delta t_i$ are the additional differences in travel time from the source to the other sensors. V is the velocity of the material, $V_{material}$, through which the signal propagates. V is determined by calculating the average y-location (vertical) for first 100 points when the chemical source is floating before either falling under gravity or the start of transport through pressure changes. The group arrival times are used to locate an event using a Broyden approach to solve a system of non-linear equations. The Broyden approach is related to Newton's method for finding function zeroes, but has higher efficiency because it calculates the entire Jacobian up front rather than at each iteration. The minimum in the value of the first 100 y=locations (FIG. 6(b)), i.e., zero crossing, as a function of $V_{assumed}$ is used to select $V_{material}$. The position of the source and $t_s$ are found for every event during the experiment.

Figure 7A:
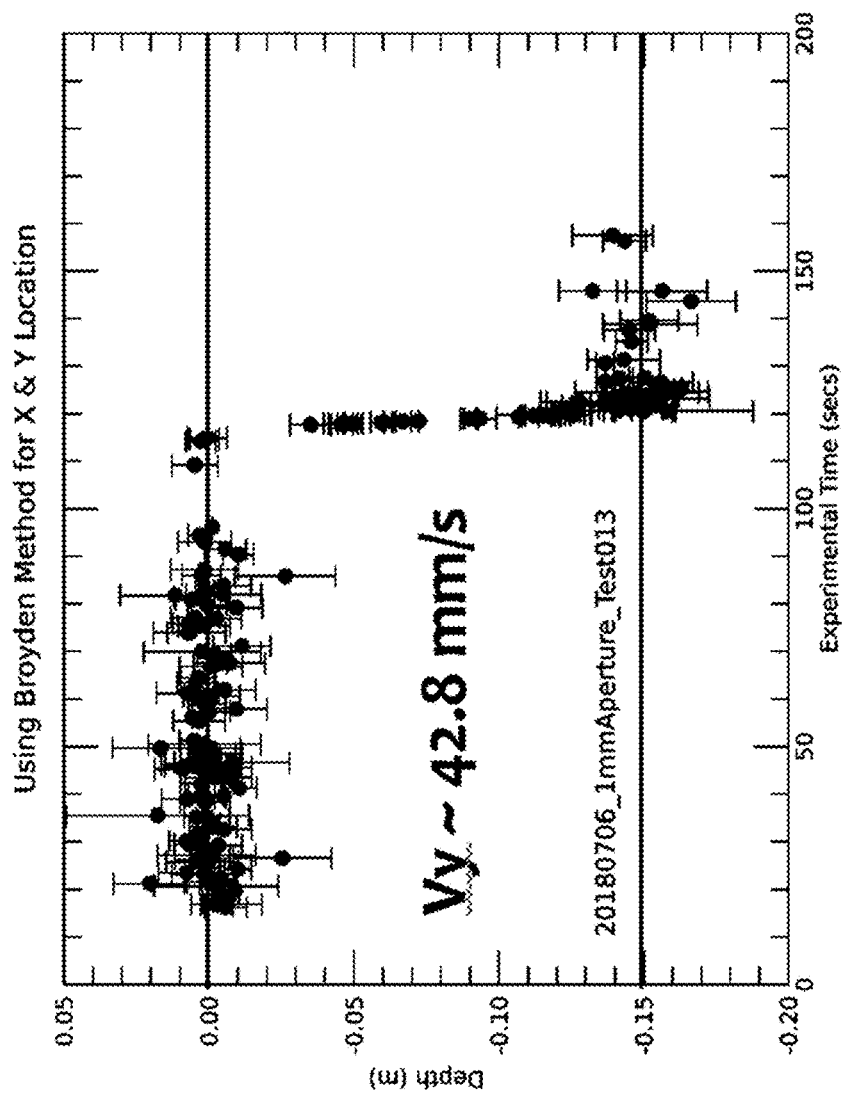
FIG. 7(a) is a graph of depth in m vs. experimental time in secs showing an example of the extracted source depth location as a function of experimental time for a 1 mm uniform-aperture fracture.
Figure 7B:
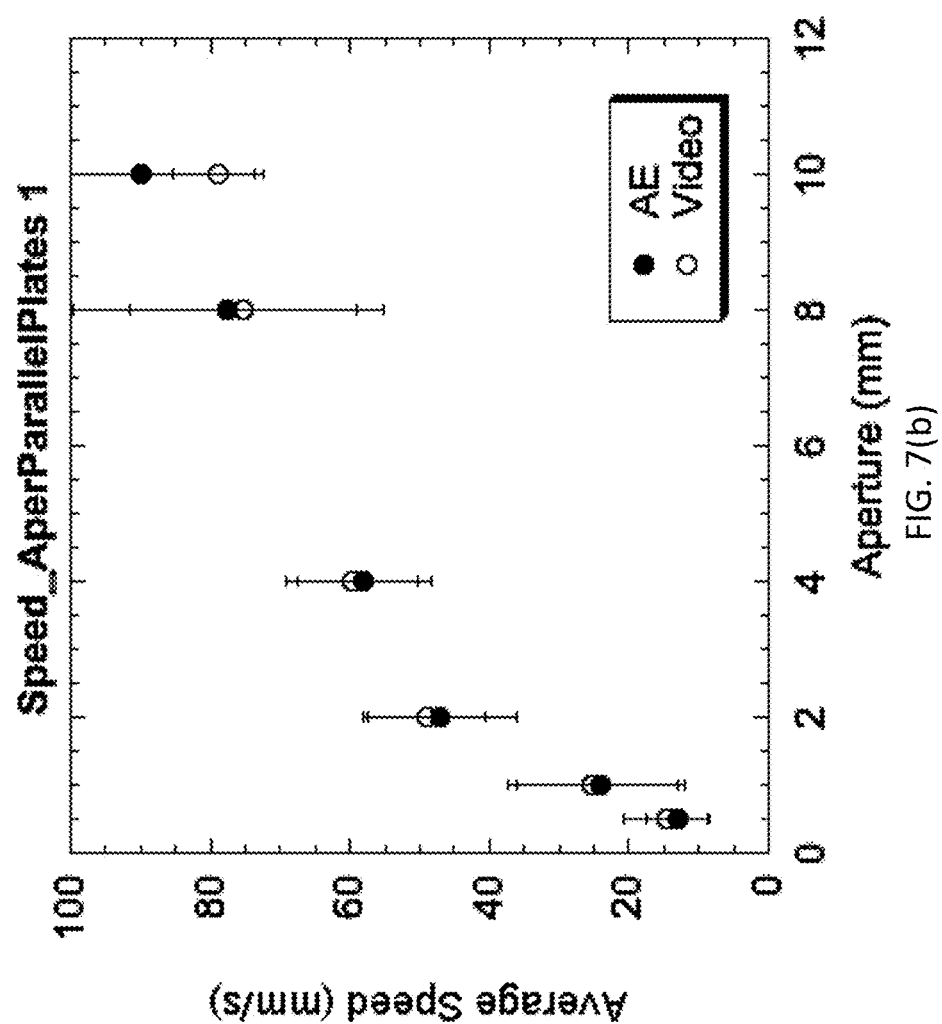
FIG. 7(b) is a graph of average speed in mm/s vs. aperture in mm width from both acoustic and video monitoring.

Referring to FIG. 7(a), a graph of depth in meters (m) vs. experimental time in seconds (secs) is provided. FIG. 7(a) thus shows an example of the extracted source depth location as a function of experimental time for a 1 mm uniform-aperture fracture. After a granule is released in the fracture, initially it rests on the air-water interface providing a good reference point for the initial position (time 20-110 seconds). This intended pause, as the granule transitions from one medium to another, enables establishment of a reference position inside the fracture. This transition is particularly important for fractures with oil/water interfaces (discussed further below), enabling the novel approach of the present disclosure to locate the oil-water interfaces in the subsurface. The emitting granule descends into the fracture, eventually coming to rest at the bottom of the fracture. The speed of the granule from the acoustic sensing was 42.8 mm/s compared to 41.2 mm/s extracted from the video. The granule descent speed increases with increasing aperture width (aperture represents the distance between two fracture walls). This increase is shown in FIG. 7(b) which is a graph of average speed (mm/s) vs. aperture (mm) width for both acoustic and video monitoring.

Figure 8:
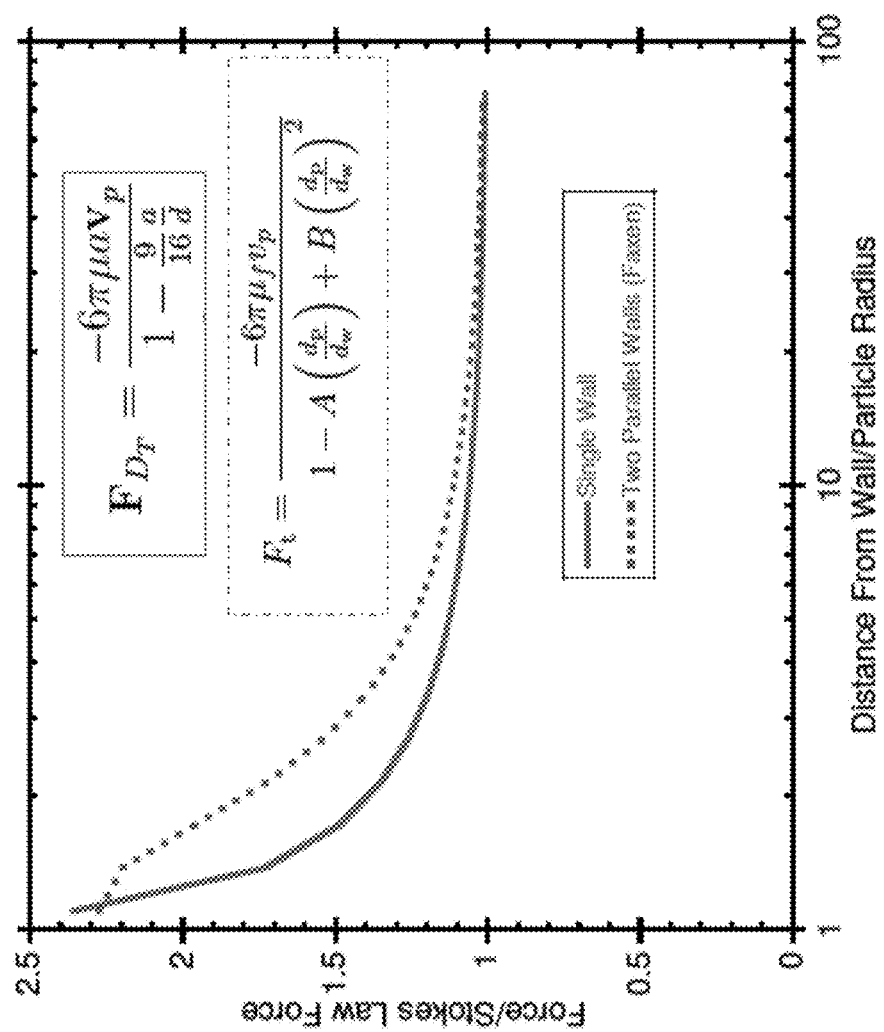
FIG. 8 is a graph of force vs. distance from a wall between two parallel walls vs. a single wall, showing a tangential or drag force on a sphere near a single wall and between two walls.

The increase in speed as a function of fracture size, follows classical behavior described by Happel and Brenner (1965) for a sphere falling between two walls. Referring to FIG. 8, a graph of force vs. distance from a wall is shown for a sphere between two parallel walls vs. a sphere near a single wall, thus showing a tangential or drag force on a sphere near a single wall and between two walls. For a single wall, the horizontal axis in FIG. 8 refers to distance from the wall divided by the particle radius. For two parallel walls, the horizontal axis represents the distance between the two walls divided by the particle radius. The drag from the wall decreases with increasing aperture (i.e., distance between the two walls). Thus monitoring changes in velocity as a chemically reactive source of the present disclosure moves through a fracture is indicative of changes in fracture aperture which controls fluid flow through a fracture.

Figure 9A:
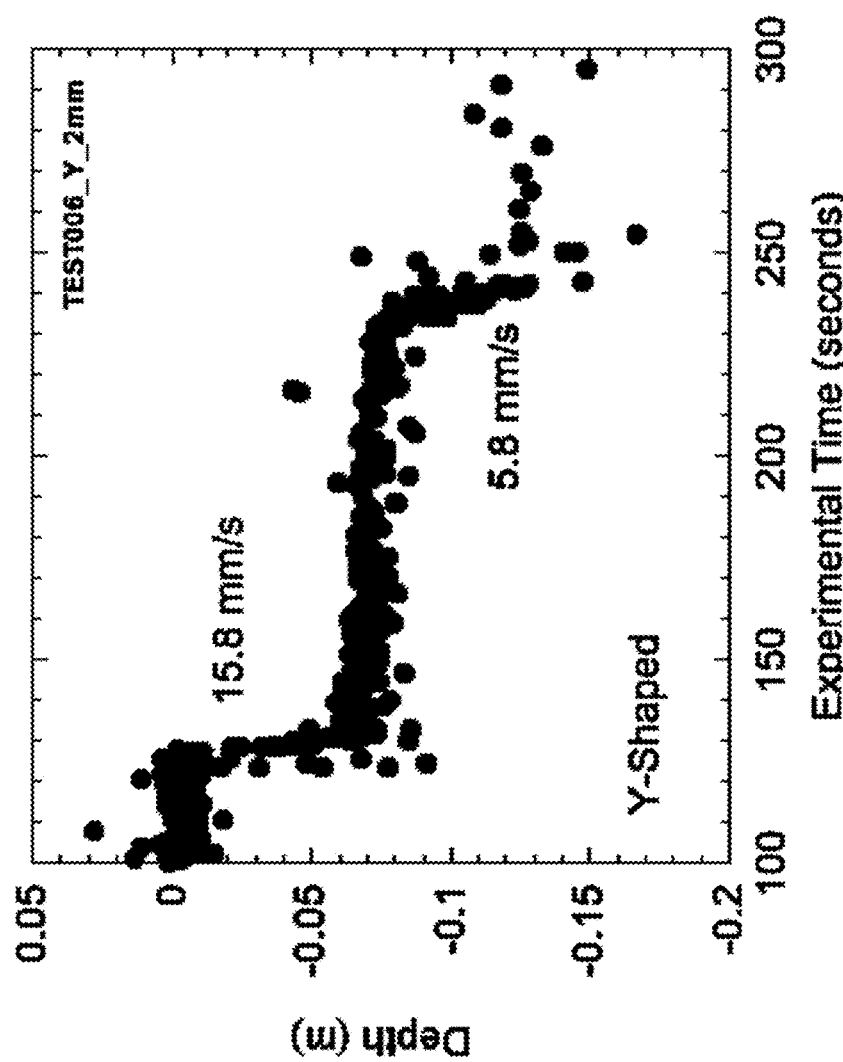
FIG. 9(a) is a graph of depth in m vs. experimental time in seconds of location of granules of the present disclosure for a Y-shaped aperture of FIG. 3(a).
Figure 9B:
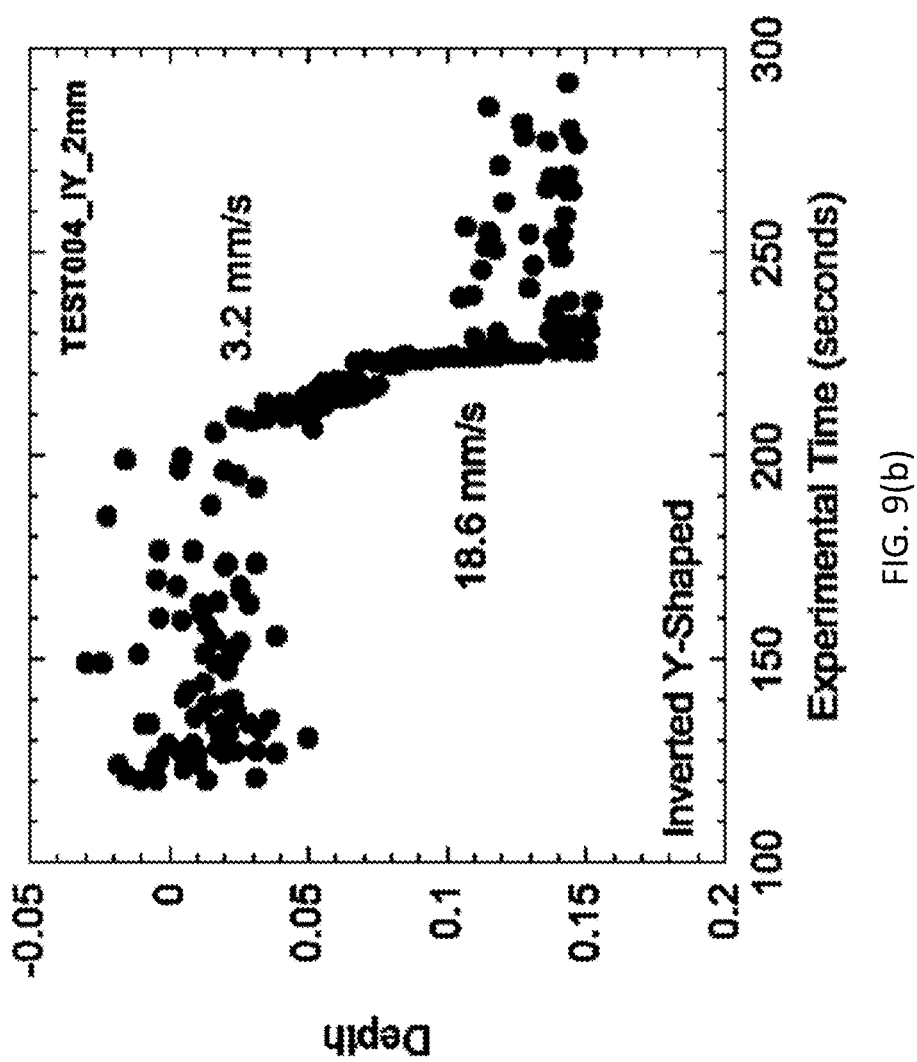
FIG. 9(b) is a graph of depth in m vs. experimental time in seconds of location of granules of the present disclosure for an inverted Y-shaped aperture of FIG. 3(b).
Figure 10:
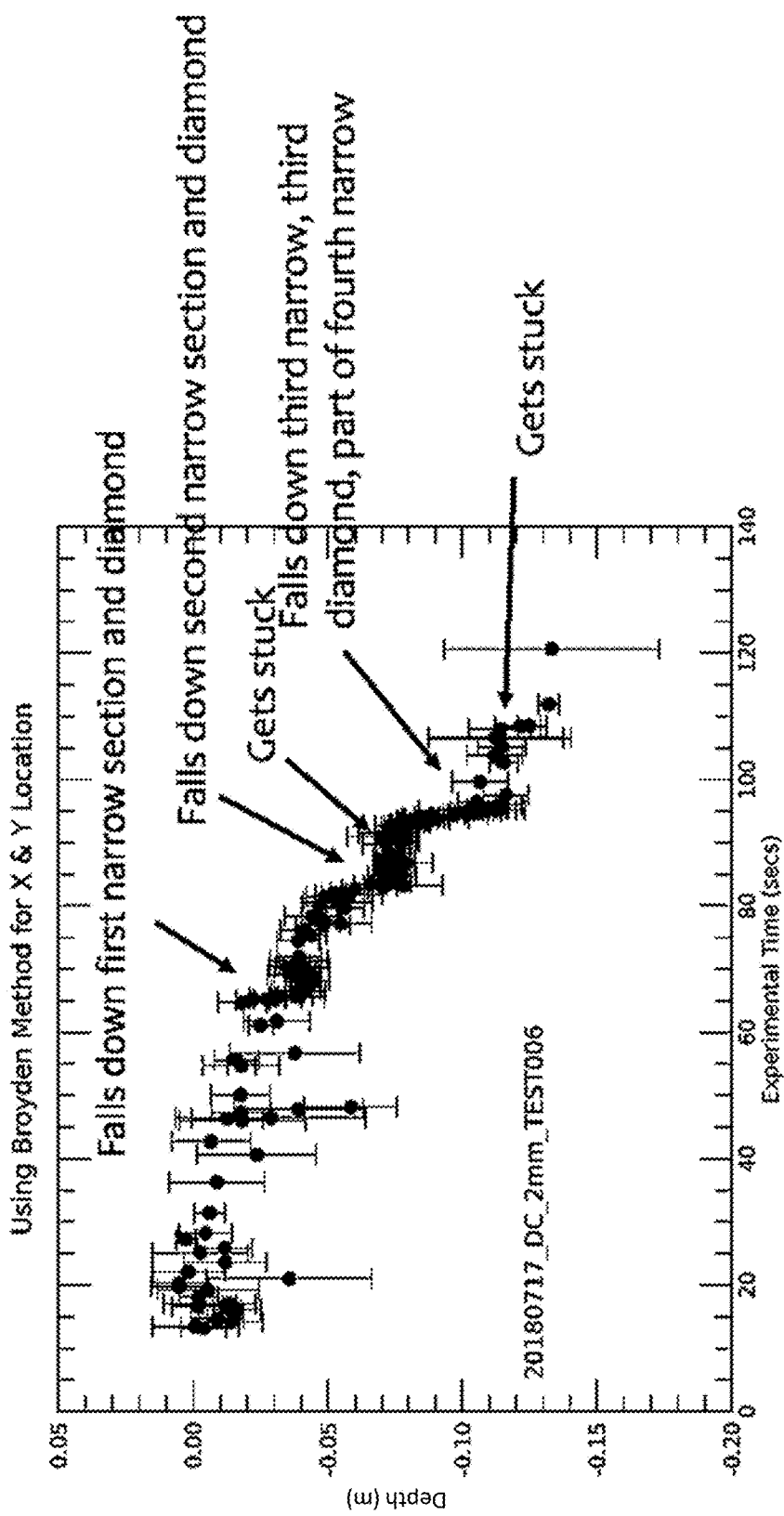
FIG. 10 is a graph of depth in m vs. experimental time in seconds of location of granules of the present disclosure for a series of diamond chain apertures of FIG. 3(f).

These experiments on variable-aperture fractures provide two key benefits of the reactive transportable sources: (1) the descent speed is a function of aperture (depicted in FIGS. 9(a) and 9(b) which provide graphs of depth vs. experimental time for two different aperture designs), and (2) if the granule is larger than the aperture, it eventually dissolves to size that is able to fit into the aperture and still emit a signal (as demonstrated in FIGS. 9(a), 9(b) and 10, where FIG. 10 is another graph of depth vs. experimental time for another aperture design). In particular, FIGS. 9(a) and 9(b) show location of transportable chemical source of the present disclosure as a function of experimental time for the Y-shaped aperture (see FIG. 3(a)) and inverted y-shaped aperture (see FIG. 3(b)), respectively. FIG. 10 shows source depth as a function of experimental time for the diamond chain aperture (see FIG. 3(f)). These dynamic properties of the emitting granule would provide a wealth of information to surface engineers, illuminating fractures while simultaneously enabling semi-quantitative information to be extracted from the subsurface geometry. This subsurface information, unavailable from any other technique, would be crucial for optimizing the extraction of hydrocarbons through the fractures, or else for monitoring contaminant flow in a super-fund site, or else for sequestering materials such as carbon dioxide or nuclear wastes.

Figures 3A, 3B, 3C, 3D, 3E, 3F:
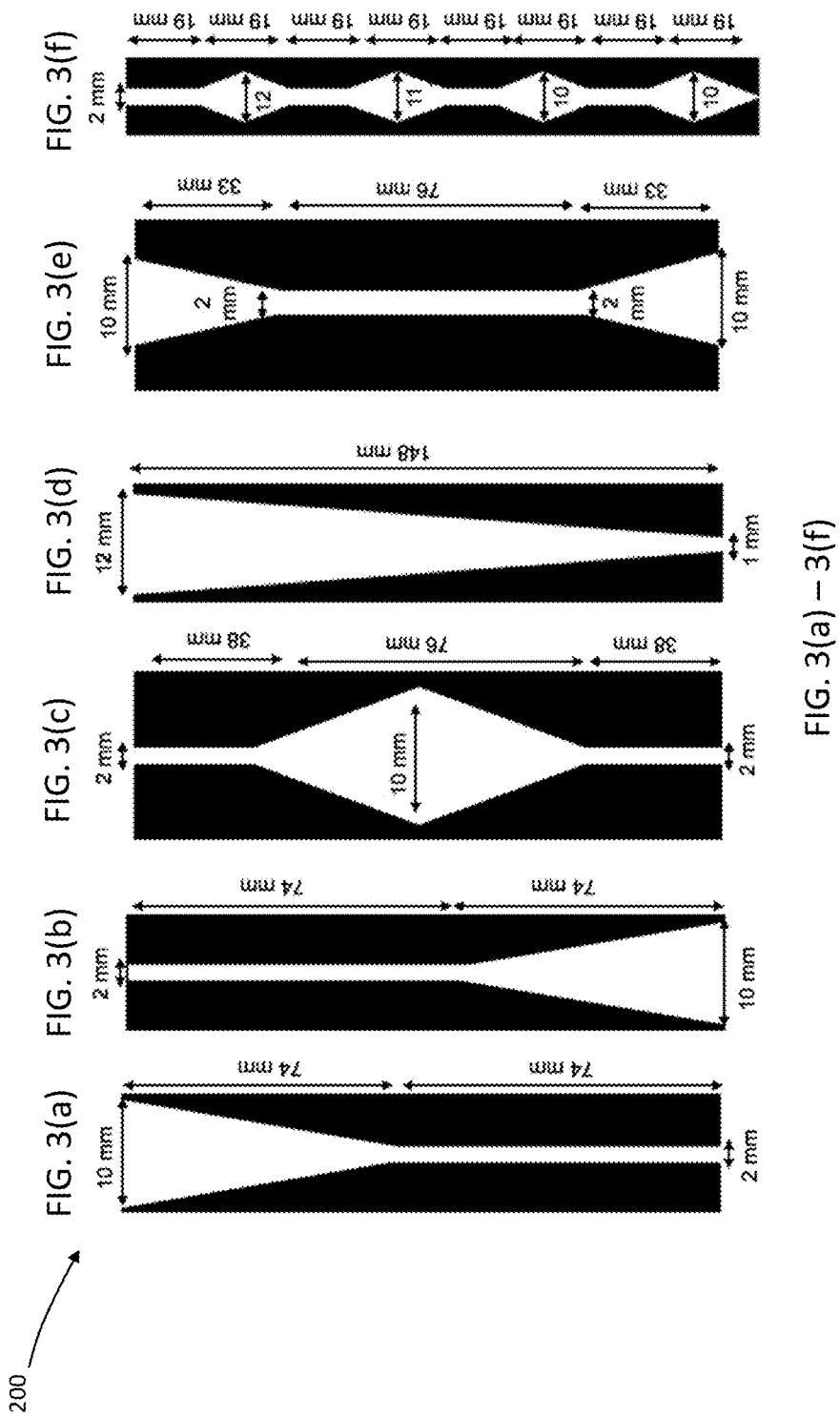
FIGS. 3(a)-3(f) are schematics of various apertures designed to be placed in the separation of FIG. 1
Figure 4A:
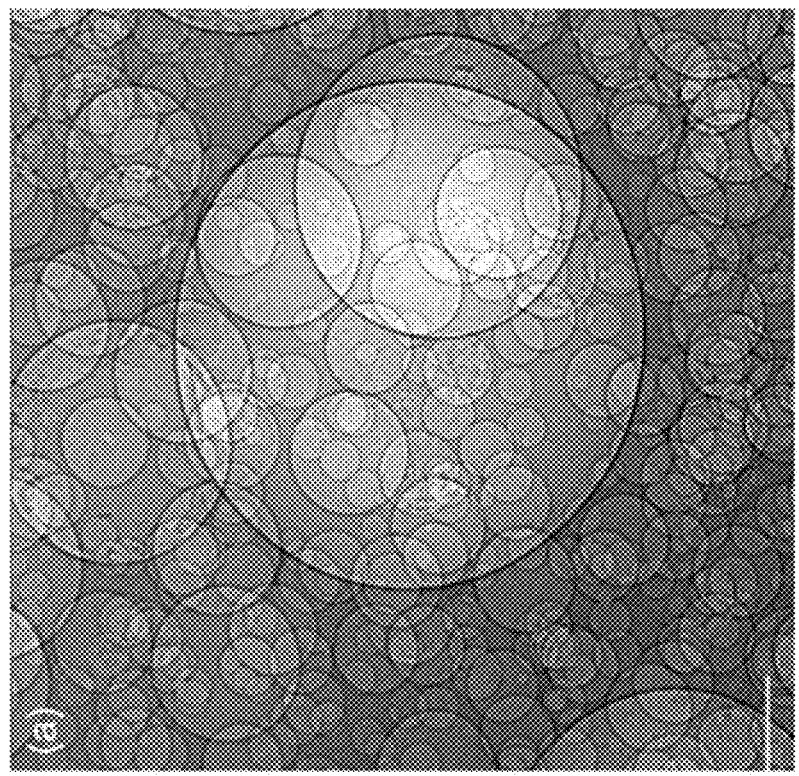
FIG. 4(a) is a 2-dimensional projection of the granules, according to the present disclosure.
Figure 4B:
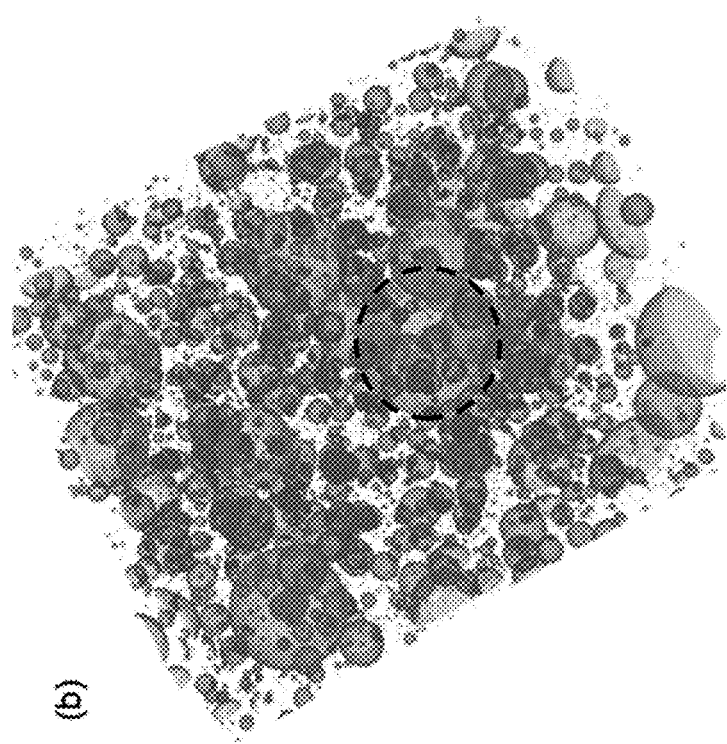
FIG. 4(b) is a 3-dimensional tomographic reconstruction of a cylindrical volume of a granule of the present disclosure with a distribution of bubbles therein
Figure 4C:
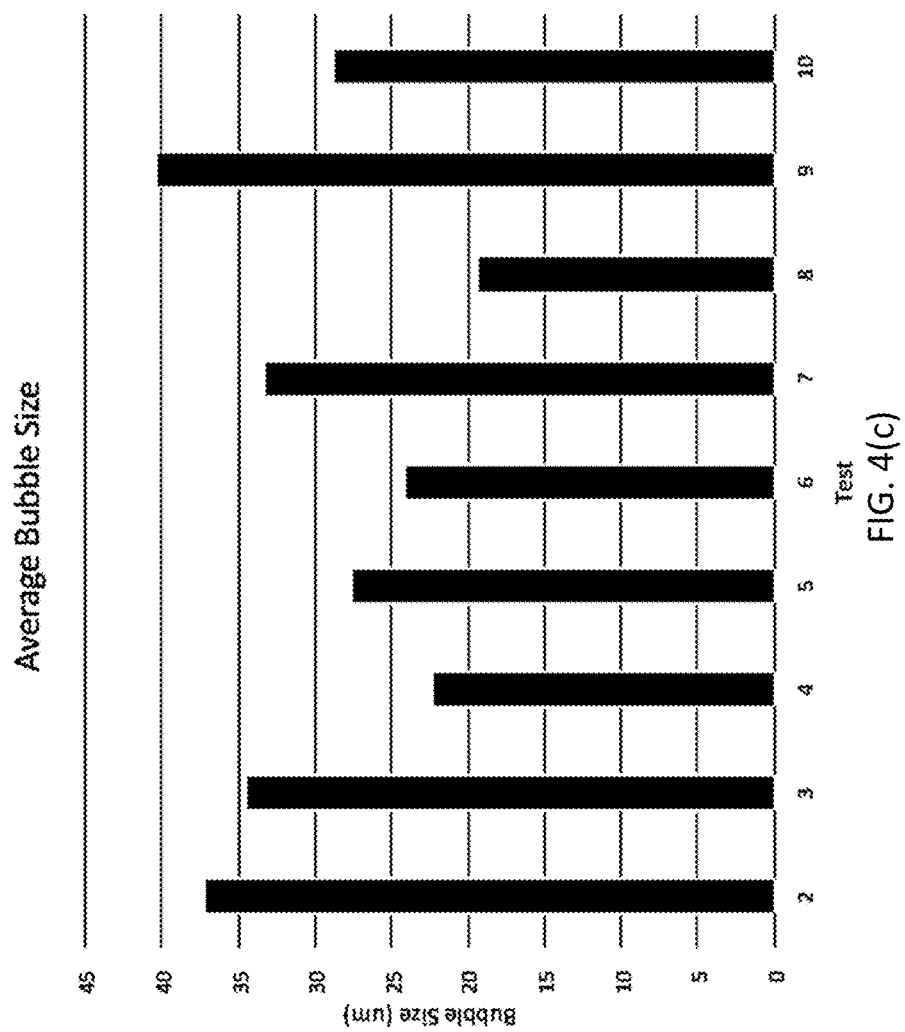
FIG. 4(c) is a histogram of average bubble size within a granule of the present disclosure from about 9 samples per test based on the 3-dimensional X-ray tomographic reconstructions of FIG. 4(b).
Figure 4D:
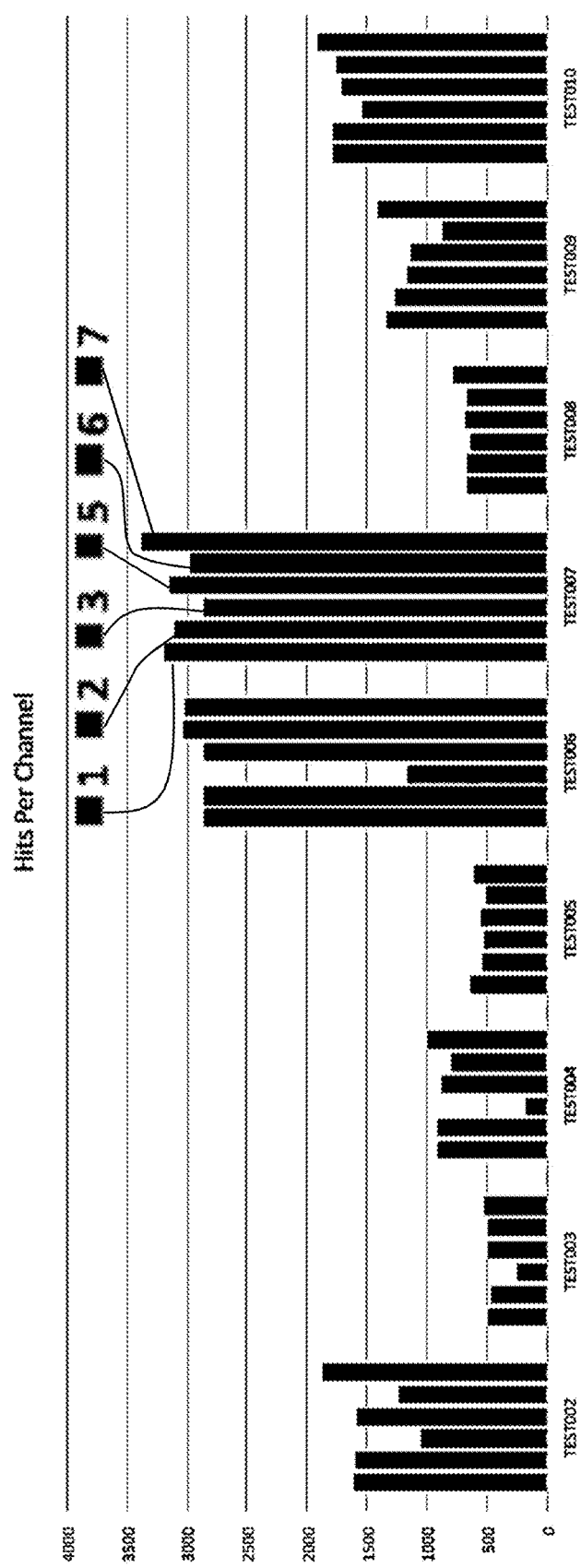
FIG. 4(d) is another histogram showing total number of recorded signals based on first arrival for the 9 tests.
Figure 4E:
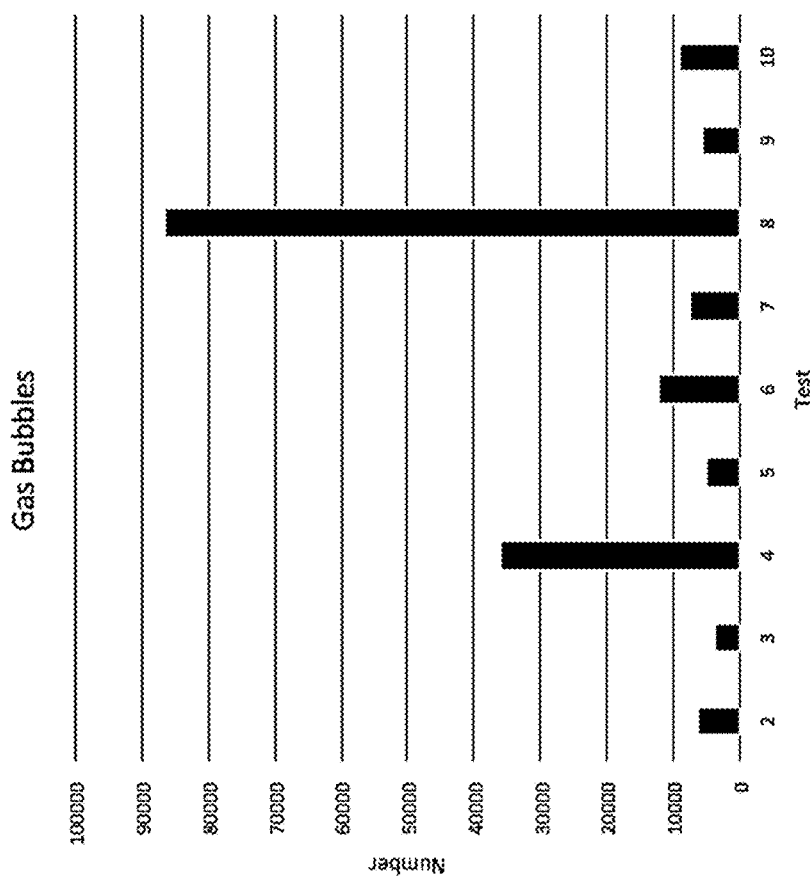
FIG. 4(e) is another histogram showing number of bubbles in each granule of the present disclosure.

To further demonstrate that the novel approach of the present disclosure enables the quantitative assessment of distant fractures, FIGS. 9(a) and 9(b) show the source location as a function of time for the Y-shaped aperture (shown in FIG. 3(a)) and the inverted y-shaped aperture (shown in FIG. 3(b)). Initially, the swarm rests at the air-water interface. For the Y-shaped aperture fracture (FIG. 9(a)) the granule travels fast in the upper converging section (15.8 mm/s) of the fracture than in the 2 mm narrow channel (5.8 mm/s). For the inverted y-shaped aperture fracture (see FIGS. 3(b) and 9(b)), the granule travels more slowly in the narrow 2 mm upper channel (3.2 mm/s) and then speeds up in the diverging aperture. As it is known to a person having ordinary skill in the art, particle swarms accelerate as fracture apertures diverge. In FIG. 9(a), it should be noted that the particle was too large to fall into the 2 mm channel of the Y-shaped aperture and remained at the top of the neck for about 100 seconds. After dissolving to the appropriate size, the granule continued its descent through the narrow channel and continued to emit though reduced in size. This is observed several times for the diamond chain fracture (see FIG. 3(f) and FIG. 10). By knowing the dissolution rate of the granule, and tracking when it enters certain apertures, one can obtain size of the apertures.

It should be appreciated that the granules of the present disclosure can be spherical, ellipsoidal (oblate or prolate), cylindrical or other geometries to shape the radiation pattern of the emitted energy. The directionality of the granules enables characterization of the anisotropy of the rock and fracture network. The orientation of the chemical sources can be controlled by preferentially weighting the particle, for example excess gas at one end of an ellipsoid would orient the source vertically or the same effect can be achieved by depositing a heavy element at one location on the surface of the source. The pattern of the released granules can also be controlled by making the chemical source from two or more different materials with different yield strengths to design for preferential failure that results in selective release of oriented micro-seismicity.

Figure 11:
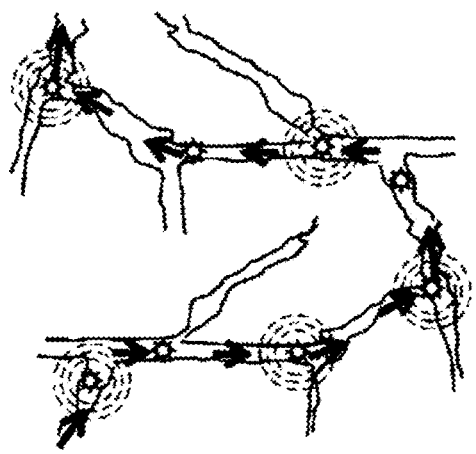
FIG. 11 is a schematic of an exemplary embodiment of traversing of the granules of the present disclosure in fissures between a delivery well and an observation well.

Referring to FIG. 11, a schematic of an exemplary embodiment of traversing of the granules of the present disclosure in fissures or fracture networks between a delivery well and an observation well is depicted. Recording of the micro-seismicity of these granules in the observation well enables illumination of the dominate flow path through subsurface fracture networks.

It should be appreciated that the novel approach discussed herein can be applied to a number of different applications. As discussed above, one such application is to determine a fingerprint of a subterranean structure. A key benefit of this technique that can be employed to extract subsurface information is the behavior of the granules at interfaces. For instance, at an air-liquid interface, surface tension will delay the movement of the granule into the liquid. This time delay is detected using the location software as a constant position for the emitting granules. When the granules finally enter the liquid, this event is detected as the continuation of movement of the granule. The coating of the granule can be chosen to increase or decrease the delay time, for instance by changing the wettability of the coating for a target liquid (for instance wettability of a coating to oil will be different than wettability to water or brine). This delay in time can be calibrated in the laboratory during manufacture of the granules to produce different time delays for different interfaces, and then the time delay observed in the subsurface can be used to classify what type of interface was encountered by the granules.

A particularly important application of this method applies to the interface from oil to water. The granule coating may be dissolved by water but not by oil. Therefore, if the granule begins in oil, there will be no emission. However, when the particle moves into water, emissions will begin. This would be observed as a sudden onset of emissions at some deep location where no emissions had been present before. This delay would make it possible to detect an oil-water interface in the subsurface which is not addressed by prior art approaches. Alternatively or in addition, if compressed gas is sealed in thin coatings of epoxies or polypropylene or PVC, the granules would not dissolve in water but would dissolve in crude oil under the elevated temperature conditions of subsurface oil reservoirs (e.g., 50° C. to 160° C.). Accordingly, instead of a lack of signals, traversing of these granules through oil will provide positive indication of oil. The converse case, when the granule moves from water into oil would appear as a sudden cessation of emissions. Careful monitoring of emissions would be needed to distinguish between a granule moving from water into oil as opposed to a particle simply dissolving completely. This is possible because as a granule approaches dissolving completely, the rate of emissions decreases. Therefore, a high-rate emitter suddenly going silent would be an indication of a granule moving from water into oil, while an emitter that has a decreasing emission rate that slowly goes silent would simply be a granule dissolving to its end.

According to another application of the present disclosure, the granules can be used to provide a fingerprint of above-ground structures. The granules can be embedded into the actual site construction. For example, granules with long time-delay coatings would be incorporated into cement. During the curing process, the coating would dissolve slightly, but not completely. Once the cement is dry, the granules would be time-stable if the cement retains its integrity. However, if the cement forms cracks that are exposed to water, water will come into contact with the embedded granules that will begin to emit. The engineering structure could be wired with low-cost acoustic sensors. The data from the sensor could be continuously monitored online, if needed, or could be accessed when desired. The signature of the auto-seismic emitter would be different than the signature of simple cement auto-acoustic emission allowing discrimination between actual granule activation by initial structural degradation versus background auto-acoustic emissions. This could be used in many possible civil structures such as bridges, buildings, dams and tunnels, among others.

Applying the granules in a flow through a structure can also be used to detect leaks. For example, in a complex structure (above or below ground) that is leaking due to an integrity failure, the novel approach of the present disclosure can be used to detect the location of the leak. A detection fluid can be laced with granules and flowed through the leak. Alternatively, if the leak were identified externally on the structure, you could flow the granules into the structure through the leak and locate the path to find the source of the leak/crack. This would also be useful for tracking flow through complex water/sewer pipes urban settings.

Another example would be to incorporate these granules outside of an underground isolation site. For instance, nuclear waste isolation uses a "bathtub" approach, or a sarcophagus, to encapsulate nuclear waste above or below ground. If the waste begins to leak through the containment, for instance underneath the bathtub, it would activate the granules that would start to produce seismic emissions that would be picked up as a flag of initial failure of the containment. The isolated waste is often in liquid form which would be ideal for this type of detection.

Another example of application of the present disclosure can be using this novel approach in imaging a biological structure compatible with release of gases. For example, internal structures of a gastrointestinal structure can be mapped by ingesting a plurality of the granules and detecting concussing sounds of release of gas. This approach can be used to determine a blockage in the biological system. Use of selective time release coatings could be used for this application where near simultaneous signaling could identify location of a blockage.

Additionally, internal moving sources provided by the granule swarms can be used to characterize different portions of a fracture network through hydrodynamic control of swarm transport. In this approach, different subsets of receivers record different components of the scattered wave field depending on the number of fractures, fracture spacing and receiver locations. Changing spectral content provides a fundamental tool for characterizing fractures because changes in attenuation and velocity from fractures are frequency-dependent and related to the mechanical properties of fractures. In addition, moving sources may also generate guided waves (fracture interface waves, Krauklis waves, pressure waves, leaky guided modes) and converted modes (P-S or S-P, P-compressional waves, S-shear wave) that are linked to the internal geometry of a fracture or fracture set as well as fracture-matrix connectivity.

Figure 12A:
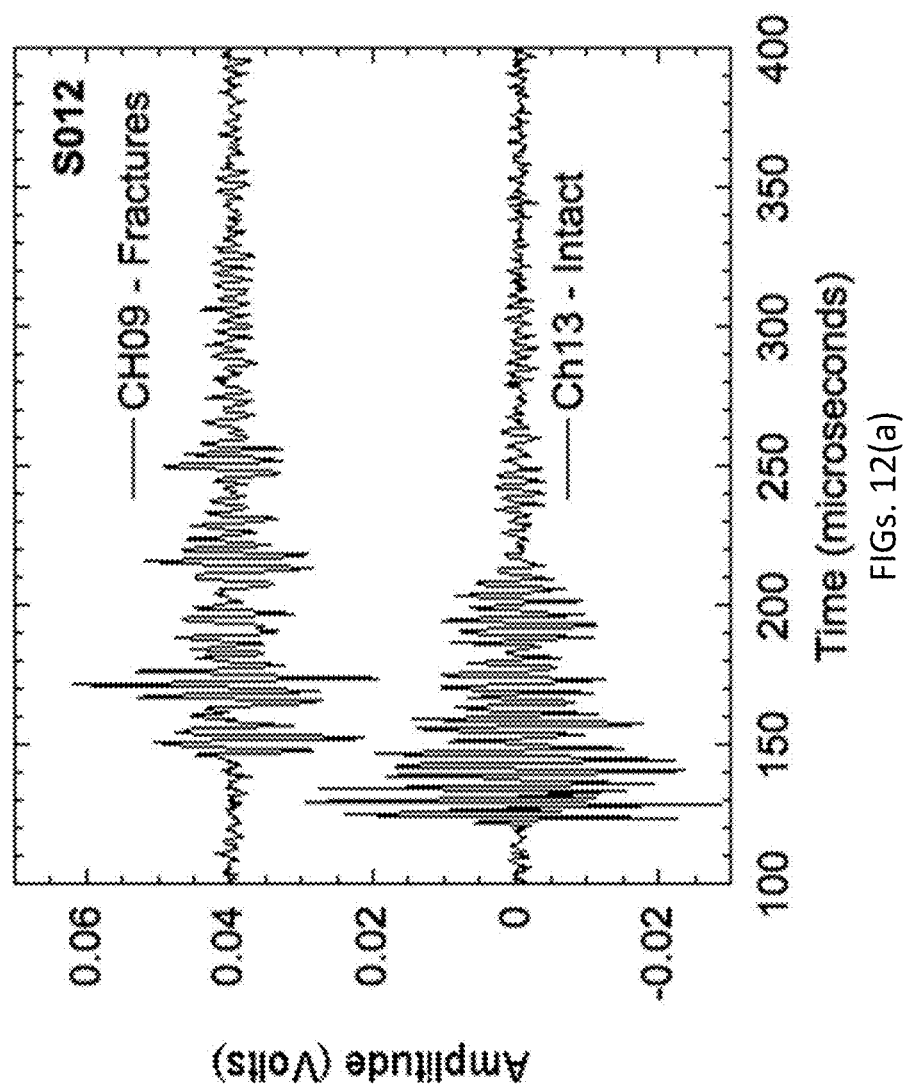
FIG. 12(a) is a graph of amplitude in volts vs. time in microseconds which shows signals recorded by transducer locations 9 (fractured region) and 13 (intact region).
Figure 12B:
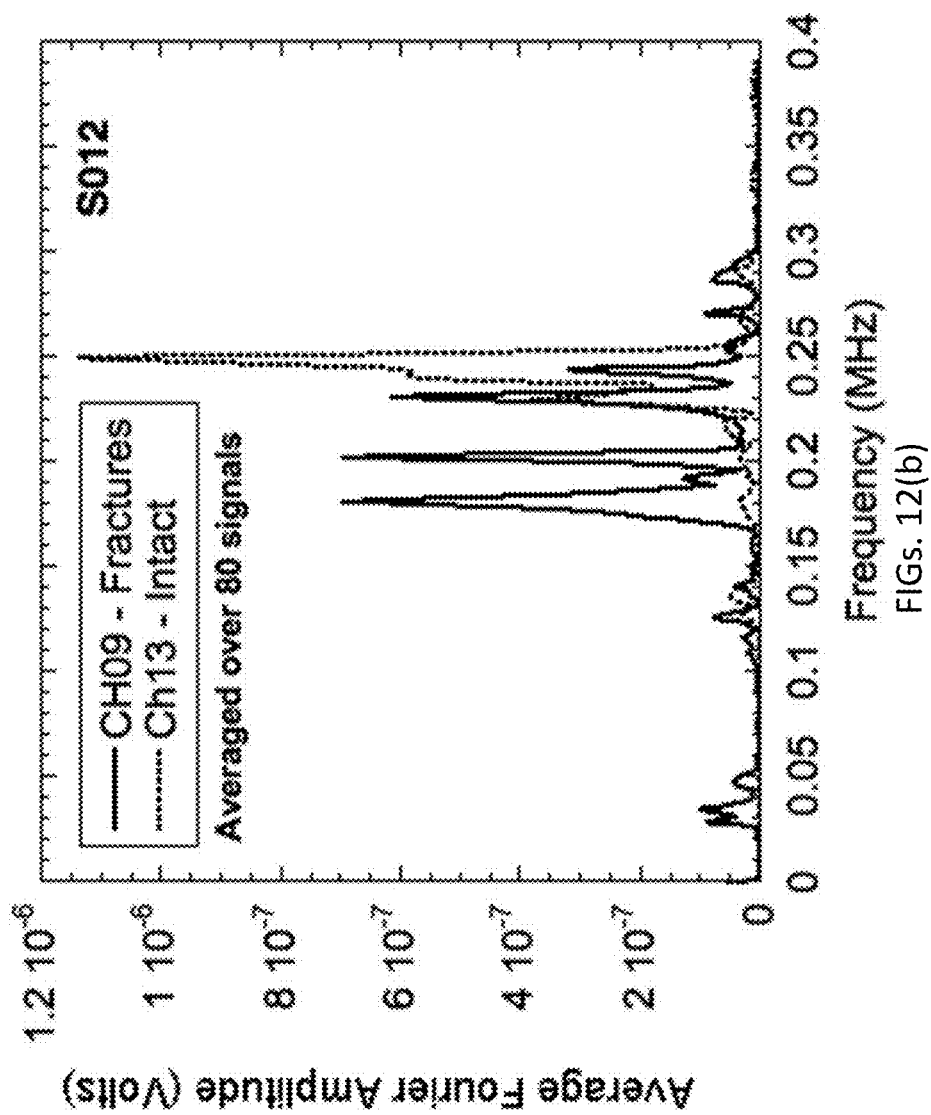
FIG. 12(b) is a graph of average Fourier amplitude in volts vs. frequency in MHz showing the average spectral content of signals recorded at the two locations of FIG. 12(a).
Figure 12C:
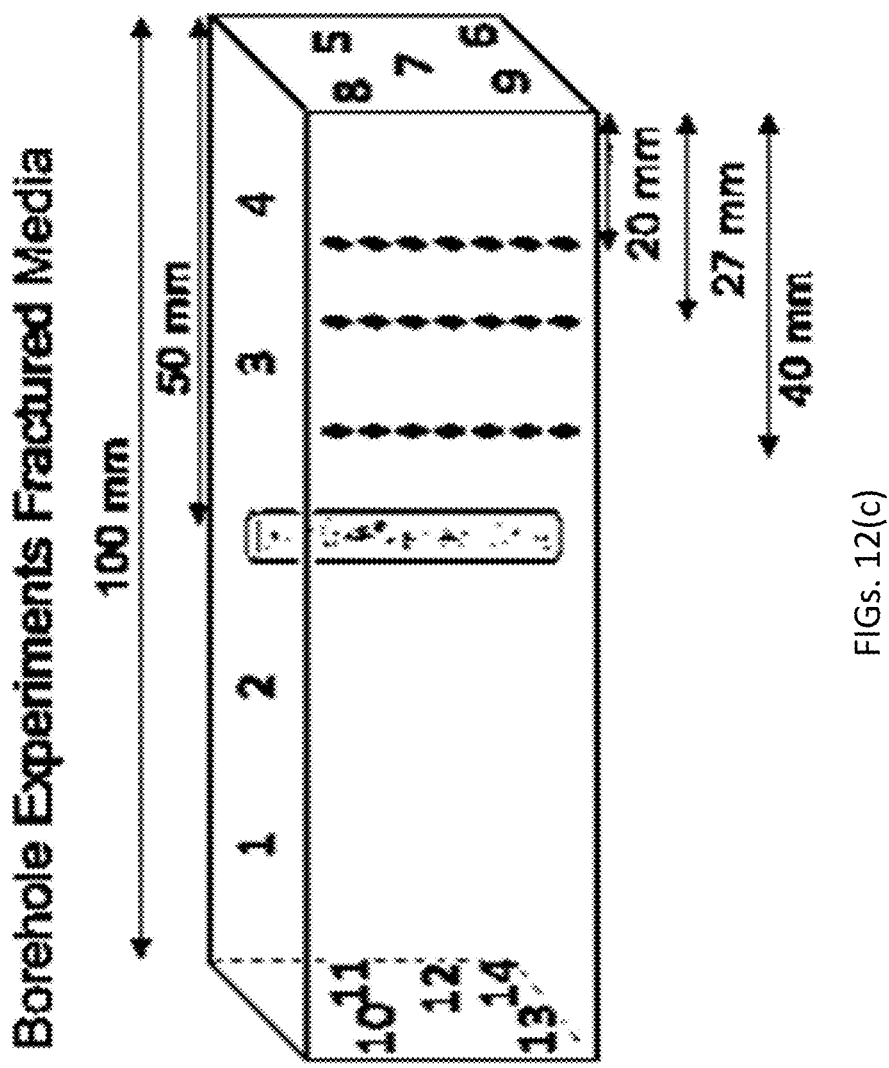
FIG. 12(c) is a schematic of sample geometry with a central borehole depicting source locations of chemically-induced microseismicity, located using the methods according to the present disclosure, and three through going vertical fractures with 13 transducers.
Figure 12D:
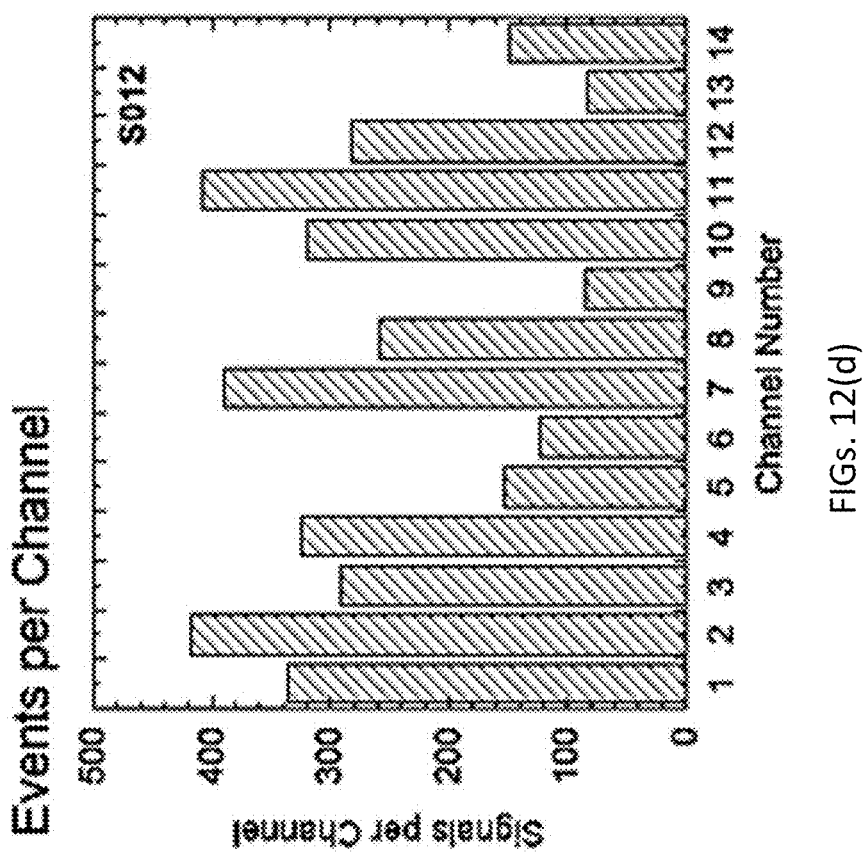
FIG. 12(d) is a graph of events recorded per transducer (channel) of FIG. 12(c).

To demonstrate this application, experiments were performed on a 3D printed sample with a central borehole where a chemically reactive swarm was released (see FIG. 12(c), which shows a schematic of sample geometry with a central borehole depicting source locations of chemically-induced microseismicity and three through going vertical fractures) to illustrate the different signals propagated through a fractured region compared to a non-fractured region. Sensors were placed around the sample to acquire signals that propagated through only intact material, and through non-uniformly spaced fractures. Signals propagated through the fractures were delayed. The average spectral content for each signal received at each receiver is taken using either a Fast Fourier transform or Nolte-Morlet Wavelet transformation, known to a person having ordinary skill in the art. Signals propagated through the fractures exhibited a decrease in the high frequency components of the signal observed for the intact sample, and contained additional spectral peaks related to fracture spacing (see FIGS. 12(a), which shows a graph of amplitude in volts vs. time in microseconds, and 12(b) which shows average Fourier amplitude in volts vs. frequency in MHz). Key signal features such as amplitude, spectral content, delay time, codas contain information about the different aspects of fracture geometry (length, spacing, variable fracture specific stiffness). FIG. 12(d) is a graph of events recorded per channel (transducer).

Figure 13:
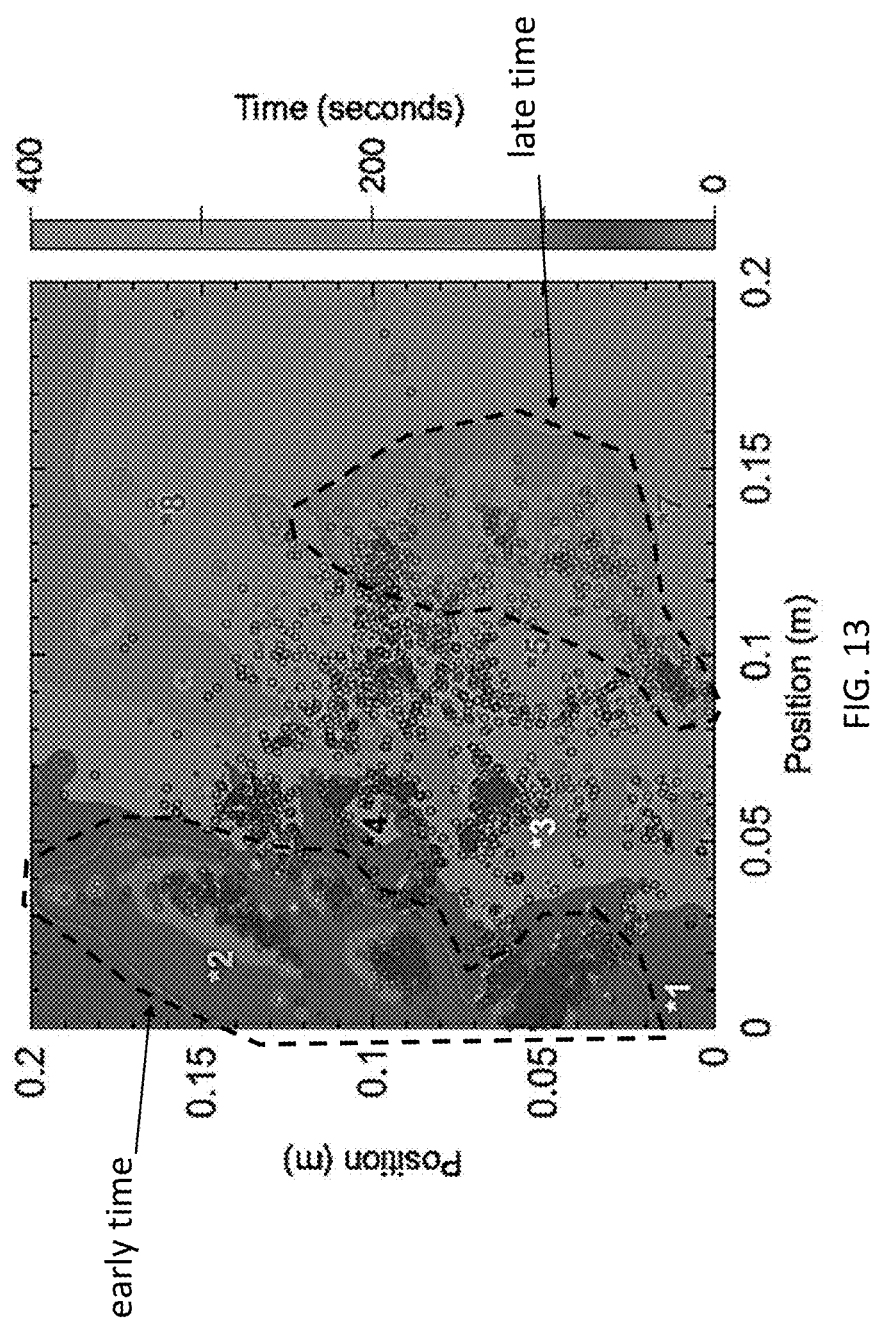
FIG. 13 is a time-lapse acoustic emission map of granule position in meters vs. position in meters showing the effect of an invading water front.

The chemical sources can also be used to seed a fracture plane to determine the water-air interface as water or other fluids invade a fracture. Experiments were performed on synthetic fracture systems to determine methods for locating and extracting information on fracture geometry from an invading fluid front as a function time. Tests show (see FIG. 13 which shows a time-lapse acoustic emission graph of position in meters vs. position in meters) the sequential position of an invading fluid front (early time (shown in dashed lines) to late time (as shown in dashed lines)).

Figures 14A, 14B:
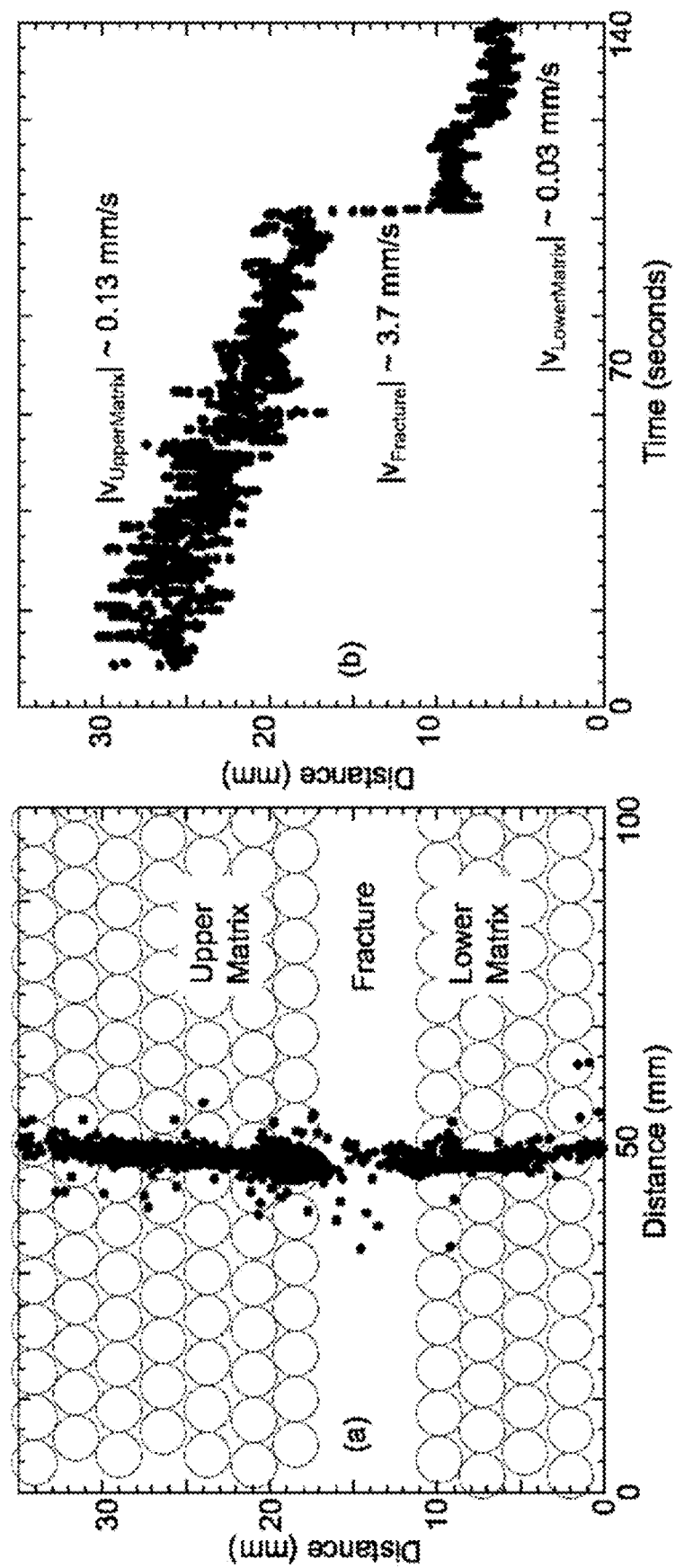
FIG. 14(a) is a graph of distance in mm vs distance in mm, showing the path taken by an acoustic-emitting chemically-reactive particle swarm as it fell under gravity through a porous-fractured media.
FIG. 14(b) is a graph of distance in mm vs. time in seconds, in which depth of the chemically-induced seismicity granules as a function of time is shown—Labels indicate the interpreted average speed, |v|, of swarm as it fell through an upper porous matrix, across a fracture and into a lower porous matrix.

Additionally, it has been shown in prior art that swarms accelerate and decelerate in response to changes in fracture apertures. Using the chemically-induced micro-seismicity of the present disclosure and swarm transport provides a unique opportunity to both locate the dominant flow path from the acoustic emissions and to quantify/estimate the aperture of the fracture as the emitting swarm velocity changes as it moves through a variable aperture fracture. A proof-of-concept experiment was performed on a porous medium with a single fracture. FIG. 14(a) which is a graph of distance in mm vs distance in mm, shows the path taken by an acoustic-emitting chemically-reactive particle swarm as it fell under gravity through a porous-fractured media. Note that fewer emissions occurred in the fracture because transport across the 10 mm aperture fracture was rapid compared to the transport through the porous medium. The speed, |v|, of the granule swarm transported through the porous fractured medium varied in response to changes in confinement (shown in FIG. 14(b) which is a graph of distance in mm vs. time in seconds), moving more than 10× faster across the fracture than in the upper matrix. As the reactive swarm dissolved, it generated ~3100 events in 3 minutes of transport through the fracture porous medium. This is a preliminary indication of the robustness of the source under Stokes settling conditions, and of the ability to track changes in flow path topology from a moving internal source.

Figure 15A:
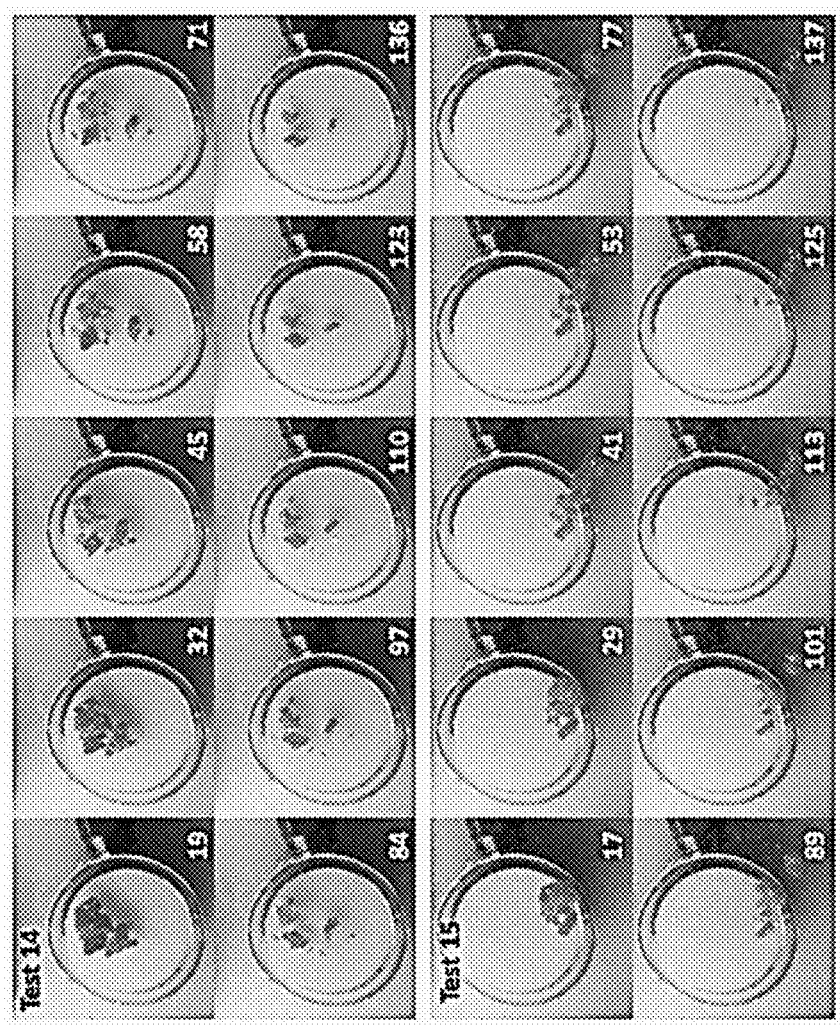
FIG. 15(a) is a time-elapse set of photographs showing how chemical granules of the present disclosure are composed of particles that can break apart (Test 14) to sample flow paths independently or travel as a particle swarm (Test 15).
Figure 15B:
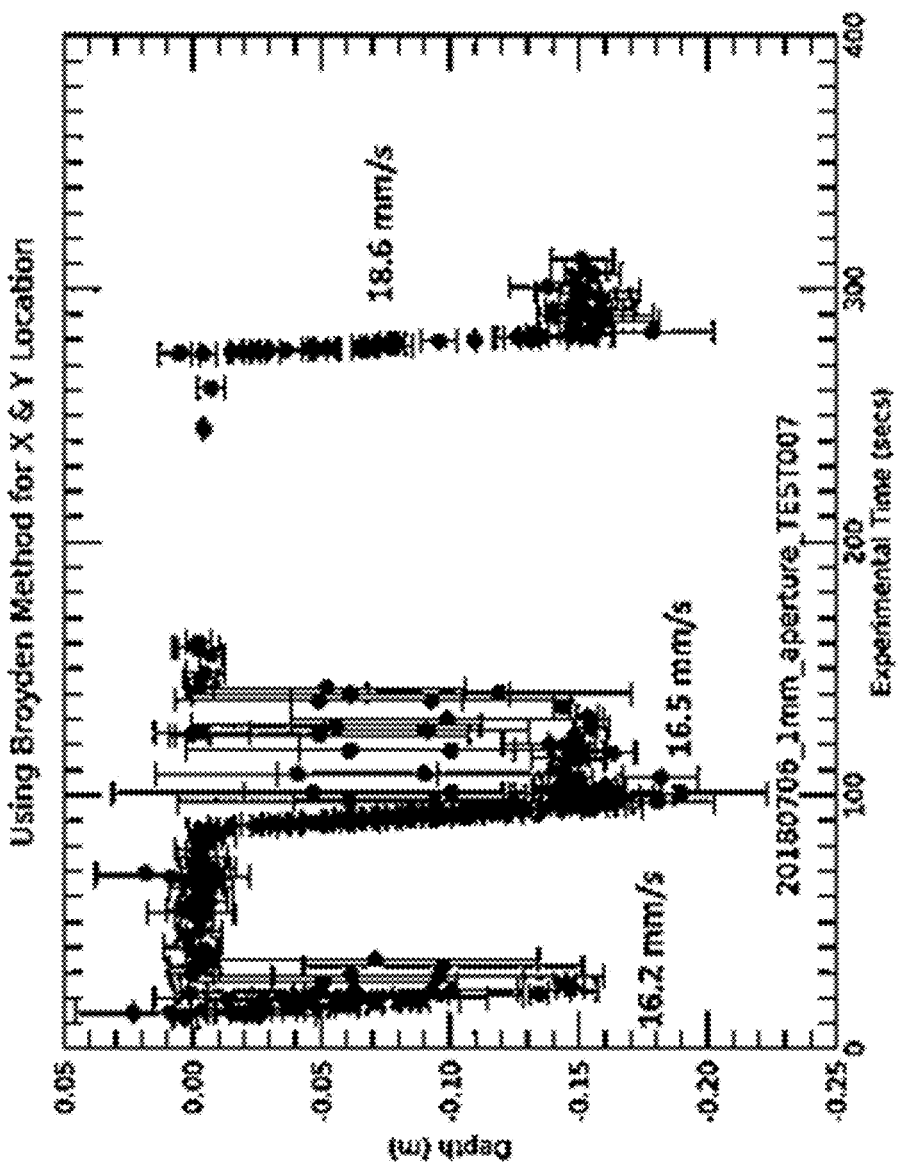
FIG. 15(b) is a graph of depth in m vs. experimental time in secs showing how when a particle separate into multiple pieces advantageously provides the ability to sample a fracture or flow path multiple times to build up information on the topology of the fracture.

A further feature of the present disclosure is the particulate nature of the chemical source. One aspect of the chemical source that relates to its use as a particle swarm is that it can be composed of multiple acoustic generating particles that can act coherently or independently. During dissolution, the particles can separate (as shown in FIG. 15(a), which is a time-elapse set of photographs showing how chemical granules are composed of particles that can break apart (Test 14) and sample flow paths independently (e.g., FIG. 13) or travel as a particle swarm (Test 15)) and are transported independently. For instance, in one test the particles separate but remain close together as they are self-propelled in the petri dish; while in another test the particles remain in place and continue to emit from one location. In addition, the ability of the granules to self-propel is another factor for particle swarms to find the path of least resistance through a fracture topology. A benefit of the particle break up is the ability to sample the same fracture or flow path multiple times to build up information on the topology of the fracture. FIG. 15(b) is a graph of depth in m vs. experimental time in secs and which shows an example where a particle separates into multiple pieces while resting at an air-water interface. Initially, part of the particle swarm descends into the 1 mm aperture fracture with a speed of 16.2 mm/s. The remaining particles remain on the interface until around 87 seconds when another descent is observed (16.5 mm/s). Finally, at 275 seconds another source descends into the fracture plane (18.6 mm/s). This demonstrates the power of the moving chemical sources to locate open pathways and to provide many signals for event location.

Those having ordinary skill in the art will recognize that numerous modifications can be made to the specific implementations described above. The implementations should not be limited to the particular limitations described. Other implementations may be possible.

The invention claimed is:

1. A system for determining a fingerprint of a structure, comprising:
a plurality of granules inserted in a structure having a plurality of fissures, fractures, and cracks (collectively apertures), each granule comprising
a membrane, and
at least one bubble of compressed gas formed in the membrane, the membrane selectively dissolving in a presence of a determined fluid and thereby selectively bursting the at least one bubble, thereby generating a concussing vibration;
at least i) three detection devices for two-dimensional mapping or ii) four detection devices for three-dimensional mapping placed proximate to the structure according to a predetermined placement schedule; and
a computing device comprising
a processor configured to receive data from the at least three or four detection devices and to determine a location of the at least one bubble of each of the plurality of the granules at the time of bursting by triangulating the concussive vibration in order to determine the location of the at least one bubble.

2. The system of claim 1, wherein the at least one bubble is between about 2,000 to about 90,000 bubbles in each of the plurality of granules.

3. The system of claim 1, wherein the at least one bubble in each of the plurality of granules is sized between from about 3 µm to about 1 mm.

4. The system of claim 3, wherein the average bubble size ranges from about 18 µm to about 100 µm.

5. The system of claim 1, the processor further configured to discriminate between concussive vibrations associated with the at least one bubble of each of the plurality of the granules by using a Hilbert transform.

6. The system of claim 5, the processor further configured to apply a Broyden nonlinear solver to determine depth, lateral location, and travel time from the at least one bubble of each of the plurality of granules at the time of busting.

7. The system of claim 1, wherein the structure is subterranean.

8. The system of claim 7, wherein the structure is a hydrocarbon sequestration field.

9. The system of claim 1, wherein the structure is above-ground.

10. The system of claim 9, wherein the structure is road-way structure.

11. A method for determining a fingerprint of a structure, comprising:
inserting a plurality of granules in a structure having a plurality of fissures, fractures, and cracks (collectively apertures), each granule comprising
a membrane, and
at least one bubble of compressed gas formed in the membrane, the membrane selectively dissolving in a presence of a determined fluid and thereby selectively bursting the at least one bubble, thereby generating a concussing vibration;
detecting the concussing vibration associated with bursting of the at least one bubble by at least i) three detection devices for two-dimensional mapping or ii) four detection devices for three-dimensional mapping placed proximate to the structure according to a predetermined placement schedule; and
receiving data from the at least three or four detection devices; and
triangulating the concussive vibrations by a processor in order to determine a location of the at least one bubble.

12. The method of claim 11, wherein the at least one bubble is between about 2,000 to about 90,000 bubbles in each of the plurality of granules.

13. The method of claim 11, wherein the at least one bubble in each of the plurality of granules is sized between from about 3 µm to about 200 µm.

14. The method of claim 13, wherein the average bubble size ranges from about 18 µm to about 40 µm.

15. The method of claim 11, the processor further configured to discriminate between concussive vibrations associated with the at least one bubble of each of the plurality of the granules by using a Hilbert transform.

16. The method of claim 15, the processor further configured to apply a Broyden nonlinear solver to determine depth, lateral location, and travel time from the at least one bubble of each of the plurality of granules at the time of busting.

17. The method of claim 11, wherein the structure is subterranean.

18. The method of claim 17, wherein the structure is a hydrocarbon sequestration field.

19. The method of claim 11, wherein the structure is above-ground.

20. The method of claim 19, wherein the structure is road-way structure.

\* \* \* \* \*